(12) United States Patent
Gupta et al.

(10) Patent No.: US 6,343,375 B1
(45) Date of Patent: *Jan. 29, 2002

(54) METHOD FOR OPTIMIZING ARRAY BOUNDS CHECKS IN PROGRAMS

(75) Inventors: Manish Gupta, Croton-on-Hudson, NY (US); Samuel Pratt Midkiff, Upper Saddle River, NJ (US); Jose Eduardo Moreira, Yorktown Heights, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/066,110

(22) Filed: Apr. 24, 1998

(51) Int. Cl.[7] .................................................. G06F 9/45
(52) U.S. Cl. .......................................................... 717/9
(58) Field of Search .......................... 717/9, 6, 7; 711/1, 711/108; 714/35

(56) References Cited

U.S. PATENT DOCUMENTS

| | | | | |
|---|---|---|---|---|
| 4,642,765 A | * | 2/1987 | Cocke et al. | 717/9 |
| 5,293,631 A | * | 3/1994 | Rau et al. | 717/7 |
| 5,361,354 A | * | 11/1994 | Greyzck | 717/9 |
| 5,586,325 A | * | 12/1996 | MacDonald et al. | 717/6 |
| 5,835,701 A | * | 11/1998 | Hastings | 714/35 |
| 5,953,531 A | * | 9/1999 | Megiddo et al. | 717/9 |
| 6,014,723 A | * | 1/2000 | Tremblay et al. | 711/1 |
| 6,076,141 A | * | 6/2000 | Tremblay et al. | 711/108 |

OTHER PUBLICATIONS

Muchnick, Advanced Compiler Design and Implementation, Morgan Kaufmann Publishers, pp. 454–457, Jun. 1997.*

Fortran 77 for Scientist and Engineers, Third Edition, by Nyhoff and Leestma, "Multimensional Arrays", pp. 385–391.

* cited by examiner

Primary Examiner—Mark R. Powell
Assistant Examiner—Hoang-Vu Antony Nguyen-Ba
(74) Attorney, Agent, or Firm—McGuireWoods, LLP; Douglas W. Cameron

(57) ABSTRACT

A method and several variants for optimizing the detection of out of bounds array references in computer programs are described, while preserving the semantics of the computer program. Depending on the variant implemented, the program is divided at run-time or compile-time into two or more regions. The regions are differentiated by the number of checks that need to be performed at run-time on the array accesses within the region. In particular, some regions of the program will not need any array bounds checks performed at run-time, which will increase the speed at which the computer program executes. As well, the state of program variables at the time any out of bounds access is detected is the same as the state of the program variables would have been had the transformation not been performed. Moreover, the regions not needing any checks at run-time will be known at compile-time, enabling further compiler optimizations on the region. The variants of the method are distinguished by the number of regions created, the number of checks needed at run-time, and the size of the program that results from the optimization.

13 Claims, 39 Drawing Sheets

∄ : THE REFERENCE $A_j [\sigma_j]$ IS NOT EXECUTED.
OK : THE REFERENCE $A_j [\sigma_j]$ EXECUTES SUCCESSFULLY.
∅ : $A_j$ IS A NULL POINTER.
< : $\sigma_j < lo(A_j)$.
> : $\sigma_j > up(A_j)$.
? : THE OUTCOME IS UNKNOWN.

∄ : THE REFERENCE $A_j[\sigma_j]$ IS NOT EXECUTED.
OK : THE REFERENCE $A_j[\sigma_j]$ EXECUTES SUCCESSFULLY.
∅ : $A_j$ IS A NULL POINTER.
< : $\sigma_j < lo(A_j)$.
> : $\sigma_j > up(A_j)$.
? : THE OUTCOME IS UNKNOWN.

FIG.3

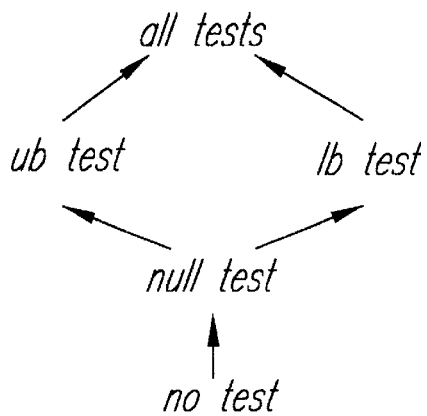

FIG.4

| $\chi_j$ | $\tau_{min}(\chi_j)$ |
|---|---|
| ∄ | no test |
| OK | no test |
| ∅ | null test |
| < | lb test |
| > | ub test |
| ? | all tests |

FIG.5

| max (a,b) | | b | | | | |
|---|---|---|---|---|---|---|
| | | no test | null test | lb test | ub test | all tests |
| a | no test | no test | null test | lb test | ub test | all tests |
| | null test | null test | null test | lb test | ub test | all tests |
| | lb test | lb test | lb test | lb test | all tests | all tests |
| | ub test | ub test | ub test | all tests | ub test | all tests |
| | all tests | all tests | all tests | all tests | all tests | all tests |

1402  do $i = l_j,...,u_j$
1403  do $i = R[\sigma].l.R[\sigma].u$
1404     $B_{R[\sigma].\tau}(i)$
1405  end do
1406 end do $\equiv$

1407

1408 do $\sigma = 1,...,n$
1409    if $(R\sigma[\tau] = \tau_1)$ then
1410       do $i = R[\sigma].l.R[\sigma].u$
1411          $B_{\tau_1}(i)$
1412       end do
1413    end if
1414    if $(R[\sigma].\tau = \tau_2)$ then
1415       do $i = R[\sigma].l.R[\sigma].u$
1416          $B_{\tau_2}(i)$
1417       end do
1418    end if
1419    $\vdots$
1420    if $(R\sigma[\tau] = \tau_m)$ then
1421       do $i = R[\sigma].l.R[\sigma].u$
1422          $B_{\tau_1}(i)$
1423       end do
1424    end if
1425 end do

FIG.14

1501
```
1502  do σ = 1, n
1503    do i = R[σ].l, R[σ].u
1504      B_{R[σ].T}(i)
1505    end do
1506  end do
```

1507
```
1508  do σ = 1, n
1509    do i = l_1[σ], u_1[σ]
1510      B_{T_1}(i)
1511    end do
1512    do i = l_2[σ], u_2[σ]
1513      B_{T_2}(i)
1514    end do
1515    ⋮
1516    do i = l_m[σ], u_m[σ]
1517      B_{T_m}(i)
1518    end do
1519  end do
```

FIG. 15

1601
```
1602  do i_1 = l_{i_1}, u_{i_1}
1603    S^1(i_1)
1604    do i_2 = l_{i_2}, ..., u_{i_2}
1605      B(i_1, i_2)
1606    end do
1607    S^2(i_1)
1608  end do
```

⇒

1609
```
1610  do σ_1 = 1, n_1
1611    do i_1 = R_1[σ_1].l, R_1[σ_1].u
1612      S^1_{R_1[σ_1].T}(i_1)
1613      do σ_2 = 1, n_2
1614        do i_2 = R_2[σ_2].l, R_2[σ_2].u
1615          B_{R_1[σ_1].T, R_2[σ_2].T}(i)
1616        end do
1617      end do
1618      S^2_{R_1[σ_2].T}(i_1)
1619    end do
1620  end do
```

1701:
```
1702  do σ₁ = 1, n₁
1703    do i₁ = R₁[σ₁].l, R₁[σ₁].u
1704      S¹_{R₁[σ₁].T}(i₁)
1705      do σ₂ = 1, n₂
1706        do i₂ = R₂[σ₂].l, R₂[σ₂].u
1707          B_{R₁[σ₁].T, R₂[σ₂].T}(i)
1708        end do
1709      end do
1710      S²_{R₁[σ₁].T}(i₁)
1711    end do
1712  end do
```

1713:
```
1714  do σ₁ = 1, n
1715    if (R₁[σ₁] = T₁¹) then
1716      do i = R₁[σ₁].l, R₁[σ₁].u
1717        S¹_{T₁¹}(i)
1718        do σ₂ = 1, n²
1719          if (R₂[σ₂] = T₂¹) then
1720            do i₂ = R₂[σ₂].l, R₂[σ₂].u
1721              B_{T₁¹,T₂¹}(i₁, i₂)
1722            end do
1723          end if
1724          ...
1725          if (R₂[σ₂] = T₂^{m₂}) then
1726            do i₂ = R₂[σ₂].l, R₂[σ₂].u
1727              B_{T₁¹,T₂^{m₂}}(i₁, i₂)
1728            end do
1729          end if
1730        end do
1731        S¹_{T₁¹}(i)
1732      end do
1733    end if
1734    ...
1735    if (R₁[σ₁].T = T₁^{m₁}) then
1736      do i = R₁[σ₁].l, R₁[σ₁].u
1737        S¹_{T₁^{m₁}}(i)
1738        do σ₂ = 1, n₂
1739          if (R₂[σ₂].T = T₂¹) then
1740            do i₂ = R₂[σ₂].l, R₂[σ₂].u
1741              B_{T₁^{m₁},T₂¹}(i₁, i₂)
1742            end do
1743          end if
1744          ...
1745          if (R₂[σ₂].T = T₂^{m₂}) then
1746            do i₂ = R₂[σ₂].l, R₂[σ₂].u
1747              B_{T₁^{m₁},T₂^{m₂}}(i₁, i₂)
1748            end do
1749          end if
1750        end do
1751        S²_{T₁^{m₁}}(i)
1752      end do
1753    end if
1754  end do
```

2501

2502 do $i_1 = l_{i_1}, u_{i_1}$
2503 $S^1(i_1)$
2504 do $i_2 = l_{i_2}, u_{i_2}$
2505 $B(i_1, i_2)$
2506 end do
2507 $S^2(i_1)$
2508 end do $\Rightarrow$

2509

2510 do $\sigma_1 = 1, n_1$
2511   if$(R_1[\sigma_1].\tau = $true$)$then
2512     do $i_1 = R_1[\sigma_1].l, R_1[\sigma_1].u$
2513       $S^1_{true_1}(i_1)$
2514       do $i_2 = l_{i_2}, u_{i_2}$
2515         $B_{true_1}(i_1, i_2)$
2516       end do
2517       $S^2_{true_1}(i_1)$
2518     end do
2519   end if
2520   if$(R_1[\sigma_1].\tau = $false$)$then
2521     do $i_1 = R_1[\sigma_1].l, R_1[\sigma_1].u$
2522       $S^1_{false_1}(i_1)$
2523       do $i_2 = l_{i_2}, u_{i_2}$
2524         $B_{false_1}(i_1, i_2)$
2525       end do
2526       $S^2_{false_1}(i_1)$
2527     end do
2528   end if
2529 end do

FIG.25

```
2601
2602  do i₁ = l_{i₁}, u_{i₁}
2603    S¹(i₁)
2604    do i₂ = l_{i₂}, u_{i₂}
2605      B(i₁, i₂)
2606    end do
2607    S²(i₁)
2608  end do
2609  S¹_{true₁}(i₁)
2610  end do
2611 end if
2612 if(R₁[σ₁]·T=false)then
2613   do i₁=R₁σ₁·l, R₁σ₁·u
2614     S¹_{false₁}(i₁)
2615     do i₂=l_{i₂}, u_{i₂}
2616       B_{false₁}(i₁, i₂)
2617     end do
2618     S²_{false₁}(i₁)
2619   end do
2620 end if
2621 end do
```

```
               2622
2623  do σ₁= 1, n₁
2624    if(R₁[σ₁]·T=true)then
2625      do i₁=R₁[σ₁]·l, R₁[σ₁]u
2626        S¹_{true₁}(i₁)
2627        do σ₂= 1, n₂
2628          if(R₂[σ₂]·T=true)then
2629            do i₂=R₂[σ₂]·l, R₂[σ₂]u
2630              B_{true₁,true₂}(i₁, i₂)
2631            end do
2632          end if
2633          if(R₁[σ₁]·T=false)then
2634            do i₂=R₂[σ₂]·l, R₂[σ₂]u
2635              B_{true₁,true₂}(i₁, i₂)
2636            end do
2637          end if
2638        end do
2639        S²_{false₁}(i₁)
2640      end do
2641    end if
2642    if(R₁[σ₁]·T=false)then
2643      do i₁=R₁[σ₁]·l, R₁[σ₁]u
2644        S¹_{false₁}(i₁)
2645        do σ₂= 1, n₂
2646          if(R₁ σ₁ T= true)then
2647            do i₂=R₂[σ₂]·l, R₂[σ₂]u
2648              B_{false₁,true₂}(i₁, i₂)
2649            end do
2650          end if
2651          if(R₂[σ₂]·T=false)then
2652            do i₂=R₂[σ₂]·l, R₂[σ₂]u
2653              B_{false₁,false₂}(i₁, i₂)
2654            end do
2655          end if
2656        end do
2657        S¹_{false₁}(i₁)'
2658      end do
2659    end if
2660 end do
```

FIG.26

2701
```
2702  do i_1 = l_{i_1}, u_{i_1}
2703    S^1(i_1)
2704    do i_2 = l_{i_2}, u_{i_2}
2705      B(i_1, i_2)
2706    end do
2707    S^2(i_1)
2708  end do
```

⇒

2709
```
2710  do σ_1 = 1, n_1
2711    do i_1 = l_{true_1}(σ_1), u_{true_1}(σ_1)
2712      S^1_{true_1}(i_1)
2713      do i_2 = l_{i_2}, u_{i_2}
2714        B_{true_1}(i_1, i_2)
2715      end do
2716      S^2_{true_1}(i_1)
2717    end do
2718    do i_1 = l_{false_1}(σ_1), u_{false_1}(σ_1)
2719      S^1_{true_1}(i_1)
2720      do i_2 = l_{i_2}, u_{i_2}
2721        B_{false_1}(i_1, i_2)
2722      end do
2723      S^2_{false_1}(i_1)
2724    end do
2725  end do
```

FIG.27

```
2818
2819 do σ₁=1, n₁
2820  do i₁=l_true₁(σ₁), u_true₁(σ₁)
2821   S¹_true₁(i₁)
2822   do σ₂=1, n₂
2823    do i₂=l_true₂(σ₂), u_true₂(σ₂)
2824     B_true₁,true₂(i₁,i₂)
2825    end do
2826    do i₂=l_false₂(σ₂), u_false₂(σ₂)
2827     B_true₁,false₂(i₁,i₂)
2828    end do
2829   end do
2830   S²_true₁(i₁)
2831  end do
2832  do i₁=l_false₁(σ₁), u_false₁(σ₁)
2833   S¹_false₁(i₁)
2834   do σ₂=1, n₂
2835    do i₂=l_true₂(σ₂), u_true₂(σ₂)
2836     B_false₁,true₂(i₁,i₂)
2837    end do
2838    do i₂=l_false₂(σ₂), u_false₂(σ₂)
2839     B_false₁,false₂(i₁,i₂)
2840    end do
2841   end do
2842   S²_false₁(i₁)
2843  end do
2844 end do
```

⇑

```
2801
2802 do σ₁=1, n₁
2803  do i₁=l_true₁(σ₁), u_true(σ₁)
2804   S¹_true₁(i₁)
2805   do i₂=l_{i₂}, u_{i₂}
2806    B_true₁(i₁,i₂)
2807   end do
2808   S²_true₁(i₁)
2809  end do
2810  do i₁=l_false₁(σ₁), false₁(σ₁)u
2811   S¹_false₁(i₁)
2812   do i₂=l_{i₂}, u_{i₂}
2813    B_false₁(i₁,i₂)
2814   end do
2815   S²_false₁(i₁)
2816  end do
2817 end do
```

Box 3001:
```
3002  do i_1 = l_{i_1}, u_{i_1}
3003    S^1(i_1)
3004    do i_2 = l_{i_2}, u_{i_2}
3005      B(i_1, i_2)
3006    end do
3007    S^2(i_1)
3008  end do
```

Box 3009:
```
3010  do i_1 = l_{i_1}, u_{i_1}
3011    S^1(i_1)
3012    do i_2 = l_{i_2}, l^3_{i_2} - 1
3013      B_{true_2}(i_1, i_2)
3014    end do
3015    do i_2 = l^3_{i_2}, u^3_{i_2}
3016      B_{false_2}(i_1, i_2)
3017    end do
3018    do i_2 = u^3_{i_2} + 1, u_{i_2}
3019      B_{true_2}(i_1, i_2)
3020    end do
3021    S^2(i_1)
3022  end do
```

Box 3023:
```
3024  do i_1 = l_{i_1}, l^3_{i_1} - 1
3025    S^1_{true_1}(i_1)
3026    do i_2 = l_{i_2}, l^3_{i_2} - 1
3027      
3028      B_{true_1, true_2}(i_1, i_2)
3029    end do
3030    do i_2 = l^3_{i_2}, u^3_{i_2}
3031      B_{true_1, false_2}(i_1, i_2)
3032    end do
3033    do i_2 = u^3_{i_2} + 1, u_{i_2}
3034      B_{true_1, true_2}(i_1, i_2)
3035    end do
3036    S^2_{true_1}(i_1)
3037  end do
3038  do i = l^3_{i_1}, u^3_{i_2}
3039    S^1_{false_1}(i_1)
3040    do i_2 = l_{i_2}, l^3_{i_2} - 1
3041      B_{false_1, true_2}(i_1, i_2)
3042    end do
3043    do i_2 = l^3_{i_2}, u^3_{i_2}
3044      B_{false_1, false_2}(i_1, i_2)
3045    end do
3046    do i_2 = u^3_{i_2} + 1, u_{i_2}
3047      B_{false_1, true_2}(i_1, i_2)
3048    end do
3049    S^2_{false_1}(i_1)
3050  end do
3051  do i_1 = u^3_{i_1} + 1, u_{i_1}
3052    S^1_{true_1}(i_1)
3053    do i_2 = l_{i_2}, l^3_{i_2} - 1
3054      B_{true_1, true_2}(i_1, i_2)
3055    end do
3056    do i_2 = l^3_{i_2}, u^3_{i_2}
3057      B_{true_1, true_2}(i_1, i_2)
3058    end do
3059    do i_2 = u^3_{i_2} + 1, u_{i_2}
3060      B_{true_1, true_2}(i_1, i_2)
3061    end do
3062    S^2_{false_1}(i_1)
      end do
```

FIG. 30

```
3201
3202  do σ₁= 1, n
3203    if(R₁[σ₁].T=T₁ˡ) then
3204      do i₁=R₁[σ₁].l, R₁[σ₁]u
3205        S¹ₗ₁(i₁)
3206        do i₂=l_{i₂}, u_{i₂}
3207          B¹ₗ₁(i₁,i₂)
3208        end do
3209        S²ₗ₁(i₁)
3210      end do
3211    end if
3212    if(R₁[σ₁].T=T₁^false) then
3213      do i₁ = R₁[σ₁].l, R₁[σ₁]u
3214        S¹_false₁(i₁)
3215        do i₂= l_{i₂}, u_{i₂}
3216          B_false₁(i₁,i₂)
3217        end do
3218        S¹_false₁(i₁)
3219      end do
3220    end if
3221    if(R₁[σ₁].T=T₁ᵘ) then
3222      do i₁ = R₁[σ₁].l, R₁[σ₁]u
3223        S¹_{u₁}(i₁)
3224        do i₂= l_{i₂}, u_{i₂}
3225          B_{u₁}(i₁,i₂)
3226        end do
3227        S²_{u₁}(i₁)
3228      end do
3229    end if
3230  end do
```

```
3231
3232  do σ₁= 1, n
3233    if(R₁[σ₁].T=T₁ˡ) then
3234      do i₁=R₁[σ₁].l, R₁[σ₁]u
3235        S¹ₗ₁(i₁)
3236        do i₂=l_{i₂}, u_{i₂}
3237          B_{l₁,true₂}(i₁,i₂)
3238        end do
3239        S²ₗ₁(i₁)
3240      end do
3241    end if
3242    if(R₁[σ₁].T=T₁^false) then
3243      do i₁=R₁[σ₁].l, R₁[σ₁]u
3244        S¹_false₁(i₁)
3245        do σ₂=1, n₂
3246          if(R₂[σ₂].T=T₂ˡ) then
3247            do i₂=R₂[σ₂].l, R₂[σ₂]u
3248              B_{false₁,l₂}(i₁,i₂)
3249            end do
3250          end if
3251          if(R₂[σ₂].T=T₂^false) then
3252            do i₂=R₂[σ₂].l, R₂[σ₂]u
3253              B_{false₁,false₂}(i₁,i₂)
3254            end do
3255          end if
3256          if(R₂[σ₂].T=T₂ᵘ) then
3257            do i₂=R₂[σ₂].l, R₂[σ₂]u
3258              B_{false₁,u₂}(i₁,i₂)
3259            end do
3260          end if
3261        end do
3262        S²_false₁(i₁)
3263      end do
3264    end if
3265    if(R₁[σ₁].T=T₁ᵘ) then
3266      do i₁=R₁[σ₁].l, R₁[σ₁]u
3267        S¹_false₁(i₁)
3268        do i₂=l_{i₂}, u_{i₂}
3269          B_{u₁}(i₁,i₂)
3270        end do
3271        S²_{u₁}(i₁)
3272      end do
3273    end if
3274    end do
3275  end if
3276  end do
3277
```

FIG.32

3501
| | |
|---|---|
| 3502 | do $i_1 = l_{i1}, u_{i1}$ |
| 3503 | $S^1(i_1)$ |
| 3504 | do $i_2 = l_{i2}, u_{i2}$ |
| 3505 | $B(i_1, i_2)$ |
| 3506 | end do |
| 3507 | $S^2(i_1)$ |
| 3508 | end do |

3509
| | |
|---|---|
| 3510 | do $\delta_1 = 1, n_1$ |
| 3511 | if $(R_1[\delta_1].\tau = \text{true})$ then |
| 3512 | do $i_1 = R_1[\delta_1].l, R_1[\delta_1].u$ |
| 3513 | $S^1_{\text{true}_1}(i_1)$ |
| 3514 | do $i_2 = l_{i2}, u_{i2}$ |
| 3515 | $B_{\text{true}_1}(i_1, i_2)$ |
| 3516 | end do |
| 3517 | $S^2_{\text{true}_1}(i_1)$ |
| 3518 | end do |
| 3519 | end if |
| 3520 | if $(R_1[\delta_1].\tau = \text{false})$ then |
| 3521 | do $i_1 = R_1[\delta_1].l, R_1[\delta_1].u$ |
| 3522 | $S^1_{\text{false}_1}(i_1)$ |
| 3523 | do $i_2 = l_{i2}, u_{i2}$ |
| 3524 | $B_{\text{false}_1}(i_1, i_2)$ |
| 3525 | end do |
| 3526 | $S^2_{\text{false}_1}(i_1)$ |
| 3527 | end do |
| 3528 | end if |
| 3529 | end do |

FIG. 35

```
3601
3602  do δ₁=1,n₁
3603    if (R₁[δ₁].T=true)then
3604      do i₁=R₁[δ₁].l,R₁[δ₁].u
3605        S¹_true₁(i₁)
3606        do i₂=l,i₂,u,i₂
3607          B_true1(i₁,i₂)
3608        end do
3609        S²_true₁(i₁)
3610      end do
3611    end if
3612    if (R₁[δ₁].T=false)then
3613      do i₁=R₁[δ₁].l,R₁[δ₁].u
3614        S¹_false₁(i₁)
3615        do i₂=l,i₂,u,i₂
3516          B_false1(i₁,i₂)
3617        end do
3618        S²_false₁(i₁)
3619      end do
3620    end if
3621  end do
```

```
3622
3623  do δ₁=1,n₁
3624    if (R₁[δ₁].T=true)then
3625      do i₁=R₁[δ₁].l,R₁[δ₁].u
3626        S¹_true₁(i₁)
3627        do i₂=l,i₂,u,i₂
3628          B_true1, true2(i₁,i₂)
3629        end do
3630        S²_true₁(i₁)
3631      end do
3632    end if
3633    if (R₁[δ₁].T=false)then
3634      do i₁=R₁[δ₁].l,R₁[δ₁].u
3635        S¹_false₁(i₁)
3636        do δ₂=1,n₂
3637          if (R₂[δ₂].T=true)then
3638            do i₂=R₂[δ₂].l,R₂[δ₂].u
3639              B_false1, true2(i₁,i₂)
3640            end do
3641          end if
3642          if (R₂[δ₂].T=false)then
3643            do i₂=R₂[δ₂].l,R₂[δ₂].u
3644              B_false1, false2(i₁,i₂)
3645            end do
3646          end if
3647        end do
3648        S²_false₁(i₁)
3649      end do
3650    end if
3651  end do
```

| | |
|---|---|
| 3802 | do $\delta_1=1, n_1$ |
| 3803 |   do $i_1=l_{true1}(\delta_1), u_{true1}(\delta_1)$ |
| 3804 |     $S^1_{true1}(i_1)$ |
| 3805 |     do $i_2=l_{i2}, u_{i2}$ |
| 3806 |       $B_{true1}(i_1,i_2)$ |
| 3807 |     end do |
| 3808 |     $S^2_{true1}(i_1)$ |
| 3809 |   end do |
| 3810 |   do $i_1=l_{false1}(\delta_1), u_{false1}(\delta_1)$ |
| 3811 |     $S^1_{false1}(i_1)$ |
| 3812 |     do $i_2=l_{i2}, u_{i2}$ |
| 3813 |       $B_{false1}(i_1,i_2)$ |
| 3814 |     end do |
| 3815 |     $S^2_{false1}(i_1)$ |
| 3816 |   end do |
| 3817 | end do |

$\Longrightarrow$

3818

| | |
|---|---|
| 3819 | do $\delta_1=1, n_1$ |
| 3820 |   do $i_1=l_{true1}(\delta_1), u_{true1}(\delta_1)$ |
| 3821 |     $S^1_{true1}(i_1)$ |
| 3822 |     do $i_2=l_{i2}, u_{i2}$ |
| 3823 |       $B_{true1,true2}(i_1,i_2)$ |
| 3824 |     end do |
| 3825 |     $S^2_{true1}(i_1)$ |
| 3826 |   end do |
| 3827 |   do $i_1=l_{false1}(\delta_1), u_{false1}(\delta_1)$ |
| 3828 |     $S^1_{false1}(i_1)$ |
| 3829 |     do $\delta_2=1, n_2$ |
| 3830 |       do $i_2=l_{true2}(\delta_2), u_{true2}(\delta_2)$ |
| 3831 |         $B_{false1,true2}(i_1,i_2)$ |
| 3832 |       end do |
| 3833 |       do $i_2=l_{false2}(\delta_2), u_{false2}(\delta_2)$ |
| 3834 |         $B_{false1,false2}(i_1,i_2)$ |
| 3835 |       end do |
| 3836 |     end do |
| 3837 |     $S^2_{false1}(i_1)$ |
| 3838 |   end do |
| 3839 | end do |

FIG. 38

FIG. 39

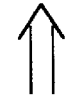
FIG. 40

```
                                    4311
                           ┌─────────────────────────────────┐
                           │ 4312  do δ=1, n                 │
                           │ 4313    do i₁=l₁ᵗʳᵘᵉ(δ), u₁ᵗʳᵘᵉ(δ) │
                           │ 4314      do i₂=l₂ᵗʳᵘᵉ(δ), u₂ᵗʳᵘᵉ(δ) │
                           │ 4315        ...                 │
                           │ 4316          do i_d=l_dᵗʳᵘᵉ(δ), u_dᵗʳᵘᵉ(δ) │
          4301             │ 4317            B true (i₁,i₂,...,i_d) │
┌─────────────────┐        │ 4318          end do            │
│ 4302  do i₁=l_i1,u_i1 │        │ 4319          ...               │
│ 4303    do i₂=l_i2,u_i2 │   ⟹    │ 4320        end do              │
│ 4304      ...    │        │ 4321    end do                  │
│ 4305      do i_d=l_id,u_id │        │ 4322    do i₁=l₁ᶠᵃˡˢᵉ(δ), u₁ᶠᵃˡˢᵉ(δ) │
│ 4306        B(i₁,i₂,...,i_d) │        │ 4323      do i₂=l₂ᶠᵃˡˢᵉ(δ), u₂ᶠᵃˡˢᵉ(δ) │
│ 4307      end do │        │ 4324        ...                 │
│ 4308      ...    │        │ 4325          do i_d=l_dᶠᵃˡˢᵉ(δ), u_dᶠᵃˡˢᵉ(δ) │
│ 4309    end do   │        │ 4326            B false (i₁,i₂,...,i_d) │
│ 4310  end do     │        │ 4327          end do            │
└─────────────────┘        │ 4328          ...               │
                           │ 4329        end do              │
                           │ 4330      end do                │
                           │ 4331  end do                    │
                           └─────────────────────────────────┘
```

| 4702 | do $i_1 = l_{i1}, u_{i1}$ |
| 4703 | $S^1$ |
| 4704 | do $i_2 = l_{i2}, u_{i2}$ |
| 4705 | $S^2$ |
| 4706 | ... |
| 4707 | $S^{d-1}$ |
| 4708 | do $i_d = l_{id}, u_{id}$ |
| 4709 | $B(i_1, i_2, ..., i_d)$ |
| 4710 | end do |
| 4711 | $S'^{d-1}$ |
| 4712 | ... |
| 4713 | $S'^2$ |
| 4714 | end do |
| 4715 | $S'^1$ |
| 4716 | end do |

4717

| 4718 | if (check) then |
| 4719 | do $i_1 = l_{i1}, u_{i1}$ |
| 4720 | $S^1_{true}$ |
| 4721 | do $i_2 = l_{i2}, u_{i2}$ |
| 4722 | $S^2_{true}$ |
| 4723 | ... |
| 4724 | $S^{d-1}_{true}$ |
| 4725 | do $i_d = l_{id}, u_{id}$ |
| 4726 | $B_{true}(i_1, i_2, ..., i_d)$ |
| 4727 | end do |
| 4728 | $S'^{d-1}_{true}$ |
| 4729 | ... |
| 4730 | $S'^2_{true}$ |
| 4731 | end do |
| 4732 | $S'^1_{true}$ |
| 4733 | end do |
| 4734 | else |
| 4735 | do $i_1 = l_{i1}, u_{i1}$ |
| 4736 | $S^1_{false}$ |
| 4737 | do $i_2 = l_{i2}, u_{i2}$ |
| 4738 | $S^2_{false}$ |
| 4739 | ... |
| 4740 | $S^{d-1}_{false}$ |
| 4741 | do $i_d = l_{id}, u_{id}$ |
| 4742 | $B_{false}(i_1, i_2, ..., i_d)$ |
| 4743 | end do |
| 4744 | $S'^{d-1}_{false}$ |
| 4745 | ... |
| 4746 | $S'^2_{false}$ |
| 4747 | end do |
| 4748 | $S'^1_{false}$ |
| 4749 | end do |
| 4750 | end if |

FIG. 47

METHOD FOR OPTIMIZING ARRAY BOUNDS CHECKS IN PROGRAMS

BACKGROUND OF THE INVENTION

1. Field of the Invention

The present invention generally relates to computer programming and, more particularly, to a method for a compiler, programmer or run-time system to transform a program so as to reduce the overhead of determining if an invalid reference to an array element is attempted, while strictly preserving the original semantics of the program.

2. Background Description

The present invention is a method for a compiler, program translation system, run-time system or a programmer to transform a program or stream of instructions in some machine language so as to minimize the number of array reference tests that must be performed while maintaining the exact semantics of the program that existed before the transformation.

A single-dimensional array A is defined by a lower bound lo(A) and an upper bound up(A). A[lo(A):up(A)] represents an array with (up(A)−lo(A)+1) elements. An array element reference is denoted by A[σ], where σ is an index into the array, also called a subscript expression. This subscript expression may be a constant value at run-time, or it may be computed by evaluating an expression which has both constant and variable terms. For the reference A[σ] to be valid, A must represent an existing array, and σ must be within the valid range of indices for A: lo(A), lo(A)+1, . . . , up(A). If A does not represent an existing array, we say that A is null. If σ is not within the valid range of indices for A, we say that σ is out of bounds. The purpose of array reference tests is to guarantee that all array references are valid. If an array reference is not valid we say that it produces an array reference violation. We can define lo(A)=0 and up(A)=−1 for null arrays. In this case, out of bounds tests cover all violations. Array references typically (but not exclusively) occur in the body of loops. The loop index variable is often used in subscript expressions within the body of the loop.

The goal of our method and its variants is to produce a program, or segment of one, in which all array reference violations are detected by explicit array reference tests. This is achieved in an efficient manner, performing a reduced number of tests. The ability to perform array reference tests in a program is important for at least three reasons:

1. Accesses to array elements outside the range of valid indices for the array have been used in numerous attacks on computer systems. See S. Garfinkel and G. Spafford, *Practical Unix and Internet Security*, O'Reilly and Associates (1996), and D. Dean, E. Felton and D. Wallach, "Java security: From HotJava to Netscape and beyond", *Proceedings of the 1996 IEEE Symposium on Security and Privacy*, May 1996.
2. Accesses to array elements outside the range of valid indices for the array are a rich source of programming errors. Often the error does not exhibit itself until long after the invalid reference, making correction of the error a time-consuming and expensive process. The error may never flagrantly exhibit itself, leading to subtle and dangerous errors in computed results.
3. Detection of array reference violations are mandated by the semantics of some programming languages, such as Java™. (Java is a trademark of Sun Microsystems, Inc.). Naively checking every array reference that occurs has an adverse effect on the execution time of the program. Thus, programs are often run with tests disabled. Therefore, to fully realize the benefits of array reference tests it is necessary that they be done efficiently.

Prior art for detecting an out of bounds array reference or a memory reference through an invalid memory address can be found in U.S. Pat. No. 5,535,329, U.S. Pat. No. 5,335,344, U.S. Pat. No. 5,613,063, and U.S. Pat. No. 5,644,709. These patents give methods for performing bounds tests in programs, but do not give methods for a programmer, a compiler or translation system for a programming language, or a run-time system to reduce the number of tests.

Prior art exists for the narrow goal of simply reducing the run-time overhead of array bounds testing, while changing the semantics of the program in the case where an error occurs. See P. Cousot and R. Cousot, "Abstract interpretation: A unified lattice model for static analysis of programs by construction or approximation of fixpoints", *Conference Record of the $4^{th}$ ACM Symposium on Principles of Programming Languages*, pp. 238–252, January 1977; W. H. Harrison, "Compiler analysis for the value ranges for variables", *IEEE Transactions on Software Engineering*, SE3(3):243–250, May 1997; P. Cousot and N. Halbwachs, "Automatic discovery of linear restraints among variables in a program", *conference Record of the $5^{th}$ ACM Symposium on Principles of Programming Languages*", pp. 84–96, January 1978; P. Cousot and N. Halbwachs, "Automatic proofs of the absence of common runtime errors", *Conference Record of the $5^{th}$ ACM Symposium on Principles of Programming Languages*, pp. 105–118, January 1978; B. Schwarz, W. Kirchgassner and R. Landwehr, "An optimizer for Ada—design, experience and results", *Proceedings of the ACM SIGPLAN '88 Conference on Programming Language Design and Implementation*, pp. 175–185, June 1988; V. Markstein, J. Cocke and P. Markstein, "Elimination of redundant array subscript range checks", *Proceedings of the ACM SIGPLAN '82 Conference on Programming Language Design and Implementation*, pp. 114–119, June 1982; R. Gupta, "A fresh look at optimizing array bounds checking", *Proceedings of the ACM SIGPLAN '90 Conference on Programming Language Design and Implementation*, pp. 272–282, June 1990; P. Kolte and M. Wolfe, "Elimination of redundant array subscript range checks", *Proceedings of the ACM SIGPLAN '95 Conference on Programming Language Design and Implementation*, pp. 270–278, June 1995; J. M. Asuru, "Optimization of array subscript range checks", *ACM Letters on Programming Languages and Systems*, 1(2):109–118, June 1992; R. Gupta, "Optimizing array bounds checks using flow analysis", *ACM Letters on Programming Languages and Systems*, 1-4(2):135–150, March–December 1993; and U.S. Pat. No. 4,642,765. These approaches fall into two major groups. In the first group, P. Cousot and R. Cousot, W. H. Harrison, P. Cousot and N. Halbwachs (both citations), and B. Schwarz et al., analysis is performed on the program to determine that an reference $A_2[\sigma_2]$ in a program will lead to an out of bounds array reference only if a previous reference $A_1[\sigma_1]$ also leads to an out of bounds array reference. Thus, if the program is assumed to terminate at the first out of bounds array reference, only reference $A_1[\sigma_1]$ needs to be checked, since reference $A_2[\sigma_2]$ will never actually perform an out of bounds array reference. These techniques are complementary to our method. That is, they can be used in conjunction with our method to provide some benefit, but are not necessary for our method to work, or for our method to provide its benefit.

In the second group, V. Markstein et al., R. Gupta (both citations), P. Kolte et al., J. M. Asuru, and U.S. Pat. No.

4,642,765, bounds tests for array references within loops of a program are optimized. Consider an array reference of the form A[σ] where the subscript expression σ is a linear function in a loop induction variable. Furthermore, the value of σ can be computed prior to the execution of each iteration. A statement is inserted to test this value against the bounds of the array prior to the execution of each iteration. The statement raises an exception if the value of σ in a reference A[σ] is less than lo(A), or is greater than up(A). The transformations in this group can also use techniques from the first group to reduce the complexity of the resulting tests.

The weakness of the first group is that at least one test must remain in the body of any loop whose index variable is used to subscript an array reference. In general, since inner-most loops index arrays, and since the number of iterations greatly exceeds the number of operations within a single iteration, the overhead of bounds testing is linearly proportional to the running time of the program, albeit with a smaller constant term than in the unoptimized program (which tests all references). Second, the methods as described do not work in loops with constructs such as Java's "try/catch" block. If the methods are extended to work with these constructs, the scope over which redundant tests can be found will be reduced, and in general the effectiveness of the transformation will be reduced.

The second group overcomes these weakness, but at the expense of no longer throwing the exception at the precise point in program execution that the invalid reference occurs. For example, the exception for an out of bounds reference that occurs in an iteration of a loop is thrown, after the transformation, before the iteration begins executing. This can make debugging the cause of an invalid access more difficult. (Diagnostic code within the program set up to give debugging information might not execute after the transformation.) Also, for certain programming languages like Java, the resulting program almost certainly does not preserve the original semantics.

Finally, none of the methods in the two groups are thread safe. The methods of the two groups have no concept of actions occurring in other threads that may be changing the size of data objects in the thread whose code is being transformed. Thus, in programs which have multiple threads, the transformations may not catch some violations, and at the same time erroneously detect some non-existent violations.

The methods we describe overcome all of these objections. When our methods are applied to programs amenable to the techniques of the first group, the number of tests that do not result in detecting a violation is less than linearly proportional to the running time of the program. Our methods also handle "try/catch" constructs. Our methods detect when an out of bounds reference is to occur immediately before the reference occurs in the original program semantics. Thus, the state of the program as reflected in external persistent data structures or observable via a debugger is identical to the state in the original program. Our transformations are also thread safe and efficient to execute. Moreover, they expose safe regions of code, code that is guaranteed not perform an invalid reference, to more aggressive compiler optimizations.

Next, we introduce some notation and concepts used in describing the preferred embodiment. We discuss the issues of multi-dimensional arrays and arrays of arrays. We then present our notation for loops, loop bodies, sections of straight-line code, and array references. Finally, we discuss some issues related to loops.

Arrays can be multi-dimensional. A d-dimensional array has d axes, and each axis can be treated as a single-dimensional array. Without loss of generality, the indexing operations along each axis can be treated independently. A particular case of multi-dimensional arrays are rectangular arrays. A rectangular array has uncoupled bounds along each axis. Some programming languages allow ragged arrays, in which the bounds for one axis depend on the index variable for another axis. Ragged arrays are usually implemented as arrays of arrays, instead of true multi-dimensional arrays. For arrays of arrays, each indexing operation can also be treated independently.

A body of code is represented by the letter B. We indicate that a body of code B contains expressions on variables i and j with the notation B(i,j). A body of code can be either a section of straight line code, indicated by S, a loop, indicated by L, or a sequence of these components.

Let L(i,l,u,B(i)) be a loop on index variable i. The range of values for i is [l,l+1, . . . ,u]. If l>u, then the loop is empty (zero iterations). The body of the loop is B(i). This corresponds to the following code:

do i=l,u

B(i)

end do, which we call a do-loop. Let the body B(i) of the loop contain array references of the form A[σ], where A is a single-dimensional array or an axis of a multi-dimensional array. In general, σ is a function of the loop index: σ=σ(i). If the body B(i) contains ρ references of the form A[σ], we label them $A_1[\sigma_1], A_2[\sigma_2], \ldots, A_\rho[\sigma_\rho]$.

In the discussion of the preferred embodiment, all loops have a unit stride. Because loops can be normalized, this is not a restriction. Normalization of a loop produces a loop whose iteration space has a stride of "1". Loops with positive nonunity strides can be normalized by the transformation $$\begin{array}{ll} \text{do } i = l_i, u_i, s_i & \text{do } i = 0, \left\lfloor \dfrac{u_i - l_i}{s_i} \right\rfloor \\ B(i) & \Rightarrow B(l_i + is_i) \\ \text{end do} & \text{end do} \end{array}$$

A loop with a negative stride can be first transformed into a loop with a positive stride:

$$\begin{array}{ll} \text{do } i = u_i, l_i, -s_i & \text{do } i = l_i, u_i, s_i \\ B(i) & \Rightarrow B(u_i + l_i - i) \\ \text{end do} & \text{end do} \end{array}$$

Loops are often nested within other loops. The nesting can be either perfect, as in do $i = l_i, u_i$ do $j = l_j, u_j$ $B(i, j)$ end do end do, where all the computation is performed in the body of the inner loop, or not perfect, where multiple bodies can be identified. For example,

```
do i = l_i, u_i
    do j = l_j, u_j
        B_1(i, j)
    end do
    do k = l_k, u_k
        B_2(i, k)
    end do
end do,
``` has bodies $B_1(i,j)$ and $B_2(i,k)$ where computation is performed.

Finally, we note that standard control-flow and data-flow techniques (see S. Muchnick, *Advanced Compiler Design and Implementation*, Morgan Kaufmann Publishers, 1997) can be used to recognize many "for", "while", and "do-while" loops, which occur in Java and C, as do-loops. Many go to loops, occurring in C and Fortran, can be recognized as do-loops as well.

SUMMARY OF THE INVENTION

The present invention provides a method for reducing the number of array reference tests performed during the execution of a program while detecting all invalid references and maintaining the same semantics as the original program. The invention describes several methods for providing this functionality. The general methodology of all variants is to determine regions of a program execution that do not need any explicit tests, and other regions that do need tests. These regions may be lexically identical, and possibly generated only at run-time. (This is the case of loop iterations, some of which may need tests, and some of which may not.) The different methods and variants then describe how to generate code consisting both of sections with explicit tests and sections with no explicit tests. The regions of the program that are guaranteed not to cause violations execute the sections of code without tests. The regions of the program that can cause violations execute the sections of code with at least enough tests to detect the violation. The methods and variants differ in the number of sections that need to be generated, the types of tests that are created in the sections with tests, and the structure of the program amenable to the particular method.

In the most general form, an inspector examines the run-time instruction stream. If an instruction causes an array reference violation, an appropriate test instruction and the original instruction are sent to an executor for execution. The inspector may translate the instructions to a form more suitable for the executor.

The first major variant on the method works by transforming loops in the program. It essentially implements the inspector through program transformations. The transformation can either be performed at the source level by a programmer or preprocessor, or in an intermediate form of the program by a compiler or other automatic translator. For each loop, up to $5^\rho$ versions of the loop body are formed, where $\rho$ is the number of array references in the loop that are subscripted by the loop control variable. Each version implements a different combination of array reference tests. A driver loop dynamically selects which version of the loop to use for each iteration. A variant of this method uses compile-time analysis to recognize that some of the versions of the loop will never execute, and therefore these versions of the loop need not be instantiated in the program. Loop nests are handled by recursively applying the transformation to each loop in the nest.

The second major variant on the method also works by transforming loops in the program. The transformation can either be performed at the source level by a programmer or preprocessor, or in an intermediate form of the program by a compiler or other automatic translator. The iteration space of the loop to be transformed is divided into three regions having one of the following properties:
1. all array references using a loop control variable are valid;
2. all iterations whose value of the loop control variable is less than those contained in the first section; and
3. all iterations whose value of the loop control variable is greater than those contained in the first section.

We call the first region the safe region, and it is guaranteed not to generate a violation on those array references involving the loop control variable. The other two regions are unsafe as they may generate violations in those references. Appropriate versions (sections) of code are generated to implement each region. Tests are generated only for code sections implementing unsafe regions of the iteration space. The exact definition of the regions and the form of the code sections implementing them depends on many implementation options. In particular, it is possible to implement this method with only two distinct versions of code. Loop nests are handled by recursively applying the transformation to each loop in the nest. In some situations, it is possible to then hoist and coalesce generated code using standard techniques.

The third major variant of the method is more selective in applying the transformations of the second variant to loop nests. The transformations are applied always in outer to inner loop order. Within a loop that has been divided into regions, they are applied only to the regions with no tests.

The fourth major variant on the method works by transforming loops in the program. The transformation can either be performed at the source level by a programmer or preprocessor, or in an intermediate form of the program by a compiler or other automatic translator. This method can be applied to loop nests where each loop is comprised of
1. a possibly empty section of straight-line code;
2. a possibly empty loop; and
3. a possibly empty section of straight-line code.

The loop nest is divided into multiple regions, where each region either (1) has no invalid array references that use a loop control variable, or (2) has one or more invalid array references that use a loop control variable. A section of code with no array reference tests is created to implement regions of type (1). Another section of code with all necessary array reference tests is created to implement regions of type (2). A driver loop steps through the regions of the iteration space of the original loop, executing code in the generated sections as appropriate.

The fifth major variant extends the concept of versions of code to any sequence of instructions. Given a set of array references in a program, two versions of code are generated: (1) one version precedes the execution of each array reference with all the necessary tests to detect any violation, whereas (2) the other version performs no tests before array references. If any violations may occur during the execution of the set of references, then version (1) is executed. Otherwise, version (2) is executed.

Finally, the sixth major variant introduces the use of speculative execution to allow optimizations to be performed on code in which array reference tests are necessary.

Given a set of array references in a program, two versions of code are generated: (1) a version which allows optimizations that version which does not allow these optimizations. The first version is do not preserve the state of the program when violations occur, and (2) a executed first, and its results are written to temporary storage. If no violations occur, then the results of the computation are saved to permanent storage. If array reference violations do occur, then the computation is performed using the second version. Therefore, the state of the program at the time of the violation is precisely preserved.

BRIEF DESCRIPTION OF THE DRAWINGS

The foregoing and other objects, aspects and advantages will be better understood from the following detailed description of a preferred embodiment of the invention with reference to the drawings, in which:

FIG. 3 is an enumeration of tests needed to detect an invalid array reference;

FIG. 4 is a schematic diagram showing the relationship between elements in the lattice of primitive tests enumerated in FIG. 3;

FIG. 5 is a table showing the relationship between outcomes (enumerated in FIG. 2) and tests (enumerated in FIG. 3) that test for that outcome;

FIG. 6 is a table which defines the function max(a, b) for two tests a and b;

FIG. 7 is a schematic illustration of the layout of the X array, which contains outcomes of array references;

FIG. 8 is a schematic illustration of the layout of the T array, which contains tests for array references;

FIG. 14 illustrates one alternative to implementing the resulting loop 1305;

FIG. 15 illustrates another alternative to implementing the resulting loop 1305;

FIG. 16 shows the application of the transformation of FIG. 12 to both loops in loop nest 1601, the resulting structure being shown in 1609;

FIG. 17 illustrates one alternative to implementing the resulting structure 1609;

FIG. 25 illustrates the first step in the process of applying the transformation in FIG. 20 to a loop nest;

FIG. 26 illustrates the second step in the process of applying the transformation in FIG. 20 to a loop nest;

FIG. 27 illustrates the first step in the process of applying the transformation in FIG. 21 to a loop test;

FIG. 28 illustrates the second step in the process of applying the transformation in FIG. 21 to a loop nest;

FIG. 29 illustrates the process of applying the transformation in FIG. 22 to a loop nest;

FIG. 30 illustrates the process of applying the transformation in FIG. 23 to a loop nest;

FIG. 32 illustrates the second step of the selective application of the method of FIG. 19 to a loop nest, the method being applied according to the implementation in FIG. 14;

FIG. 35 illustrates the first phase of the process of selectively applying the transformation in FIG. 20 to a loop nest, the transformation being applied to the outer loop 3502 of 3501 to generate 3509;

FIG. 36 illustrates the second phase of the process of selectively applying the transformation in FIG. 20 to a loop nest, the transformation being applied to the inner loop 3615 of 3601, and the resulting structure being shown in 3622;

FIG. 38 illustrates the second phase of the process of selectively applying the transformation in FIG. 21 to a loop nest, the transformation being applied to the inner loop 3812 of 3801, and the resulting structure being shown in 3818;

FIG. 39 illustrates the process of selectively applying the transformation in FIG. 22 to a loop nest 3901, the intermediate result being shown in 3909 and the final result in 3931;

FIG. 40 illustrates the process of selectively applying the transformation in FIG. 23 to a loop nest 4001, the intermediate result being shown in 4009 and the final result in 4031;

FIG. 43 illustrates an implementation of the process of FIG. 41 which uses only two instances of the loop body 4306, the instances being shown in 4317 and 4326;

FIG. 47 illustrates a process to optimize array reference checks in a loop nest 4701 by executing the whole iteration space as a single region, two instances of the original loop nest being created in 4717, one in 4719 and the other in 4735, the if-statement 4718 selecting the appropriate instance at run time;

DETAILED DESCRIPTION OF A PREFERRED EMBODIMENT OF THE INVENTION

Figures 1, 2:
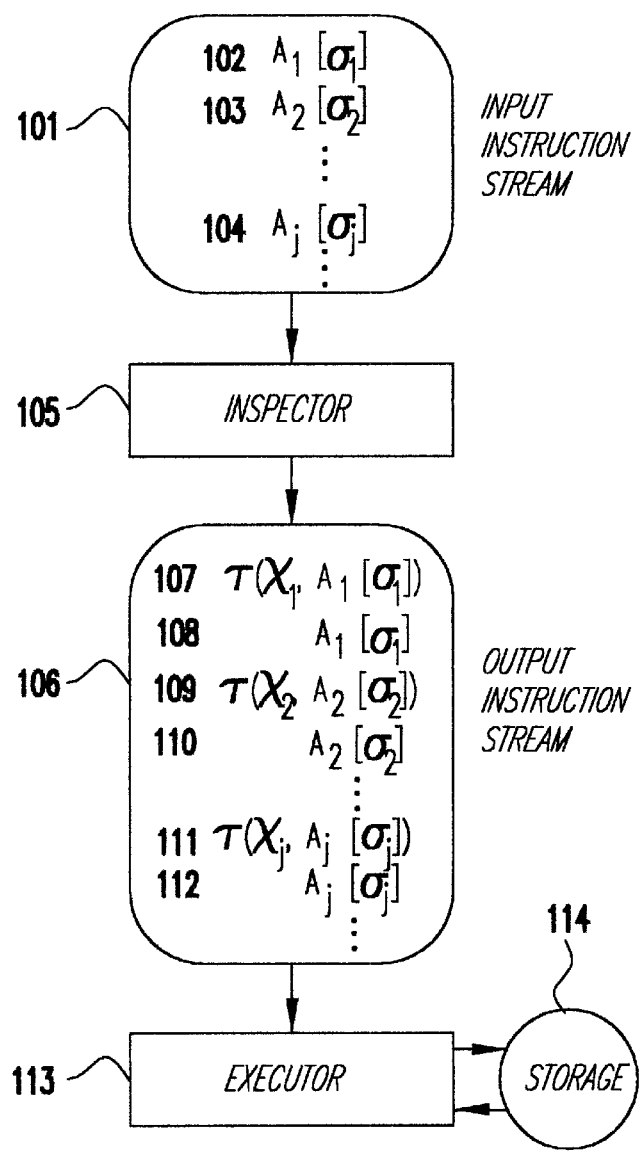
FIG. 1 is a flow chart illustrating the process for transformation of arr instruction stream with array references by an inspector, the inspector adding explicit checks before each array reference in the output stream which is executed by an executor.
FIG. 2 is an enumeration of all the outcomes of an array reference.

Referring now to the drawings, and more particularly to FIG. 1, there is shown an embodiment of the invention. A computer program is represented by an input instruction stream 101. The instruction stream contains instructions from an instruction set. Some of these instructions are explicit array references as shown in 102, 103 and 104 of FIG. 1. 104 represents a generic array reference. $A_j$ is the array or array axis being indexed, and $\sigma_j$ is the subscript indexing into $A_j$. The instructions are processed by the inspector 105, that determines the outcome $\chi_j$ of each array reference $A_j[\sigma_j]$. Possible values for $\chi_j$ are given in FIG. 2. The inspector 105 then generates an output instruction stream 106 to the executor 113, which executes the instructions.

For each array reference $A_j[\sigma_j]$ in the input instruction stream 102, inspector 105 generates a pair of instructions $(\tau(\chi_j,A_j[\sigma_j]),A_j[\sigma_j])$ in 106, where $\tau(\chi_j,A_j[\sigma])$ is a test to detect outcome $\chi_j$ in reference $A_j[\sigma_j]$. Therefore, 102, 103 and 104 of FIG. 1 are transformed into pairs (107, 108), (109, 110), and (111, 112), respectively. The test $\tau(\chi_j,A_j[\sigma_j])$ must identify all violations related to outcome $\chi_j$ of $A_j[\sigma_j]$. We define five primitive tests, which are shown in FIG. 3. These primitive tests are ordered, according to the lattice shown in FIG. 4: An arrow a→b in the lattice indicates that test b identifies at least as many violations as test a. In that case we say that test b is greater than or equal to test a, or that test b covers test a. We use the notation b≧a to denote that test b is greater than or equal to test a.

Each occurrence $\chi_j$ has an associated minimum test $\tau_{min}(\chi_j)$ that is the smallest test (in the lattice sense) that detects the violation corresponding to this occurrence. The values of $\chi_j$ and the associated minimum test are shown in FIG. 5. Note that, in terms of correctness of detecting violations, a test a can always be replaced by a test b as long as b≧a. We define max(a,b), the maximum of two tests a and b, according to the table in FIG. 6. A sequence of n tests $(a_1,a_2,\ldots,a_n)$, for the same array reference, is equivalent to the maximum test $\max(a_1, a_2, \ldots, a_n)$ of the sequence. This makes it legal to replace a single test a by a sequence of tests $(b_1,b_2,\ldots,b_m)$ as long as $\max(b_1, b_2, \ldots, b_m)\geq a$. It is also legal to replace a sequence $(a_1, \ldots, a_n)$ by a sequence $(b_1,\ldots, b_m)$ whenever $\max(a_1, a_2,\ldots, a_n)\leq \max(b_1, b_2, \ldots, b_m)$. From now on, we only consider primitive tests. The actual test $\tau(\chi_j,A_j[\sigma_j])$ to be performed before an array reference $A_j[\sigma_j]$ can be any test satisfying $$\tau(\chi_j,A_j[\sigma_j])\geq \tau_{min}(\chi_j). \tag{1}$$

Note that it is also valid to use an estimated outcome $\tilde{\chi}_j$ instead of the actual outcome $\chi_j$ as long as $\tau_{min}(\tilde{\chi}_j)\geq \tau_{min}(\chi_j)$.

As inspector 105 processes the instructions from input instruction stream 101 and generates output instruction stream 106, it can perform format conversions. In particular, if $\tau(\chi_j,A_j[\sigma_j])$=notest, then no instruction needs to be generated for this test. Also, the $A_j[\sigma_j]$ instructions in output instruction stream 106 can be optimized to execute only valid references, since any violations are detected explicitly by $\tau(\chi_j,A_j[\sigma_j])$. When all of the input instruction stream 101 has been processed by inspector 105, it signals executor 113 that the inspection phase has ended.

The executor 113 receives the instructions in the output instruction stream 106 and it may either execute them immediately, or store some number of instructions in an accessible storage 114 for execution at a later time. If the executor 113 has not begun executing the instructions in output stream 106 when the inspector 105 signals that it has concluded processing instructions in input instruction stream 101, the executor 113 begins executing the stored instructions when it receives the aforementioned signal.

As an optimization, if the inspector 105 determines that it has examined all of the static instruction stream, and that the dynamic instruction stream will not change with respect to the number and type of tests needed, the inspector 105 may signal the executor 113 to begin executing instructions out of accessible storage 114. This optimization can only be performed when the executor 113 is storing the instructions from the inspector 105.

This method to generate a program execution that explicitly detects invalid array references, in an efficient manner, while preserving the original program semantics constitutes our invention.

Specializing the Method for Loops

Let $L(i,l_i,u_i,B(i))$ be a loop on control variable i and body $B(i)$. The iteration space for this loop consists of the values of $i=l_i$, $l_i+1$, ..., $u_i$. If $l_i>u_i$, then the loop is empty (i.e., it has zero iterations). Let the body of the loop contain $\rho$ array references of the form $A_j[\sigma_j],j=1,\ldots,\rho$, where $A_j$ is a single dimensional array or an axis of a multi-dimensional array. The subscript $\sigma_j$ is an index into array $A_j$, and in general it is a function of i:$\sigma_j=\sigma_j(i)$. We order the references $A_j[\sigma j]$ so that $A_j[\sigma_j]$ appears before $A_{j+1}[\sigma_{j+1}]$, for all $j=1,\ldots,\rho-1$. The structure of the loop is as follows:

| concise form | explicit-references form |
|---|---|
| do i=l$_i$,u$_i$<br>  B(i)<br>end do | do i=l$_i$,u$_i$<br>  A$_1[\sigma_1]$<br>  A$_2[\sigma_2]$<br>  .<br>  .<br>  .<br>  A$_\rho[\sigma_\rho]$<br>end do |

We define $\chi_j[i]$ as the outcome of reference $A_j[\sigma_j]$ in iteration i. An outcome represents the result of executing the reference. The possible values for $\chi_j[i]$ are given in FIG. 2. We can express the outcome $\chi_j[i]$ as a function of the reference $A_j[\sigma_j]$ and the value of the loop index i:

$$\chi_j[i]=\gamma(A_j[\sigma_j],i). \qquad (2)$$

Figures 7, 8:
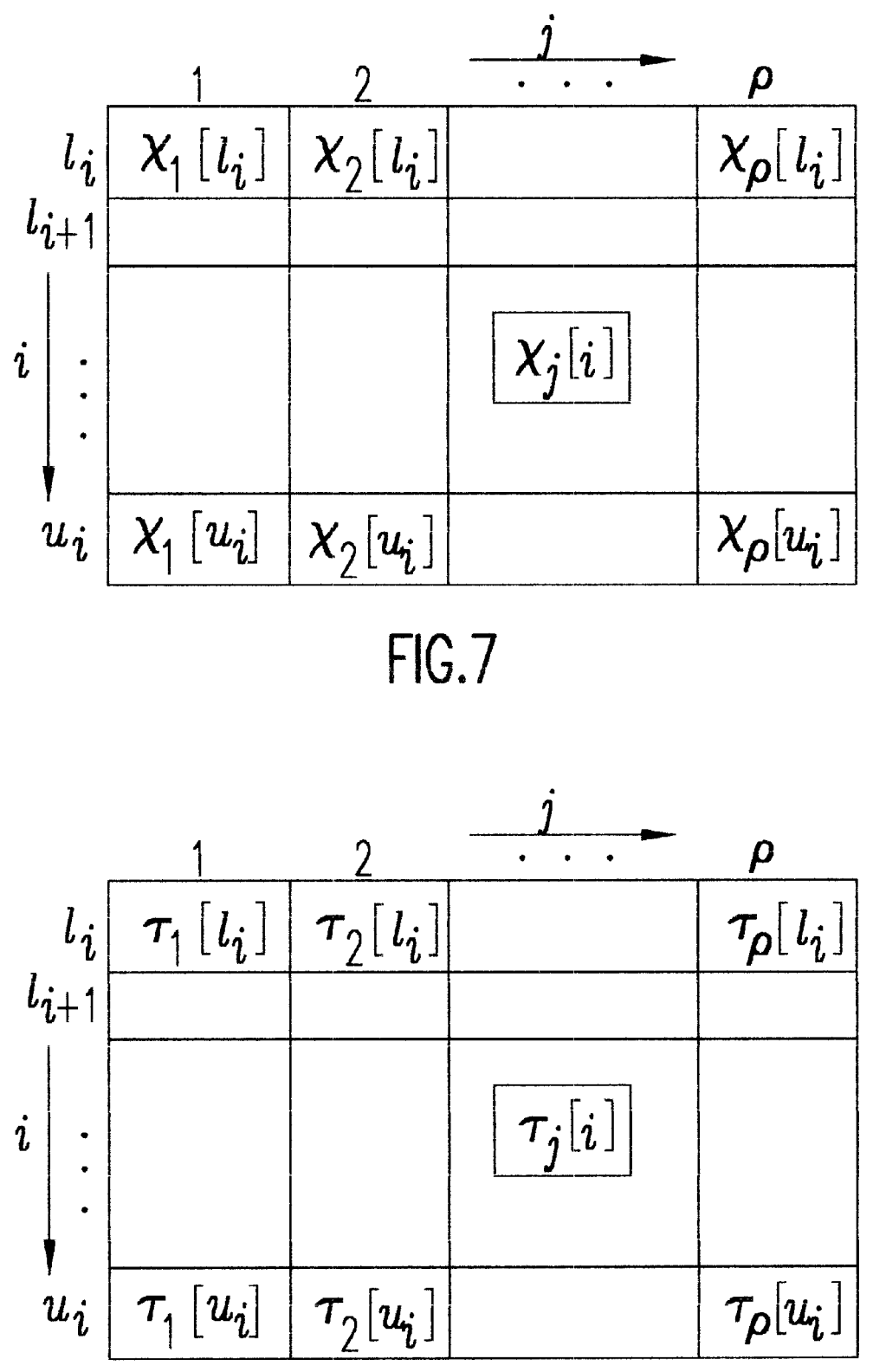

We represent by $\chi[i]$ the vector describing the $\rho$ outcomes for iteration i. Also, we represent by $X[l_i:u_i]$ the matrix of all outcomes for all iterations of loop $L(i,l_i,u_i,B(i))$. $X[i]=\chi[i]$ and $X[i][j]=\chi_j[i]$. The structure of X is shown in FIG. 7. Again, note that it is valid to use a function $\gamma(A_j[\sigma_j],i)$ that computes an estimate $\chi_j[i]$ of the outcome as long as $\tau_{min}(\chi_j[i]) \geq \tau_{min}(\chi j[i])$ We want to identify any violations (null pointers or out of bounds) that happen during execution of reference $A_j[\sigma_j]$. Therefore, before each reference $A_j[\sigma_j]$ in iteration i, we need to perform a test $\tau_j[i]$ that identifies the appropriate violation. The actual test to be performed before an array reference $A_j[\sigma_j]$ in iteration i can be expressed as a function of the outcomes of array references, the value of j for the particular reference, and the loop index i:

$$\tau_j[i]=\zeta(X,j,i) \qquad (3)$$

where $\zeta(X,j,i)$ can be any function satisfying $$\zeta(X,j,i) \geq \tau_{min}(\chi_j[i]). \qquad (4)$$

In particular, the choice of test for one reference can depend on the outcome of another reference, as in:

$$\zeta(X, j, i) = \begin{cases} no\ test & if\ \chi_k[i] = OK,\ \forall\ k = 1, \ldots, \rho, \\ all\ tests & otherwise. \end{cases} \qquad (2)$$

In this case, for each iteration, either an all tests is performed before each array reference, or no tests are performed.

We represent by $\tau[i]$ the vector describing the $\rho$ tests that have to be performed for iteration i. We represent by $T[l_i:u_i]$ the matrix of all tests for all iterations of loop $L(i,l_i,u_i,B(i))$. $T[i]=\tau[i]$ and $T[i][j]=\tau_j[i]$. The structure of T is shown in FIG. 8. The computation of $\tau_j[i]$ for all j and all i can be performed by a function Z that operates on matrix X producing matrix T (the function Z(X) can be seen as a matrix form of $\zeta(X,j,i)$):

$$T[l_i:u_i]=Z(X[l_i:u_i]). \qquad (6)$$

We define $B_{\tau[i]}(i)$ as a version of body $B(i)$ that performs the tests described by $\tau[i]$. $B_{\tau[i]}(i)$ can be constructed by the transformation:

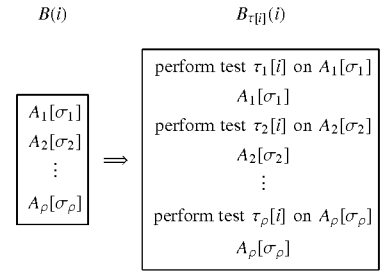

The loop $L(i,l_i,u_i,B(i))$ can be transformed into a loop $\overline{L}(i,l_i,u_i,B_{96\ [i]}(i))$ which performs the tests to detect the violations:

$$\begin{array}{ccc} do\ i = l_i, u_i & & do\ i = l_i, u_i \\ \quad B(i) & \Longrightarrow & \quad B_{\tau[i]}(i) \\ end\ do & & end\ do \end{array}$$

The transformed loop $\overline{L}(i,l_i,u_i,B_{\tau[i]}(i))$ can be generated dynamically or statically. Using dynamic code generation, the appropriate versions of the loop body $B_{\tau[i]}(i)$ can be generated before each iteration. (Versions can be saved and reused.) Using static code generation techniques, the transformed loop 901 in FIG. 9 can be implemented as shown in 905.

Figures 9, 10:
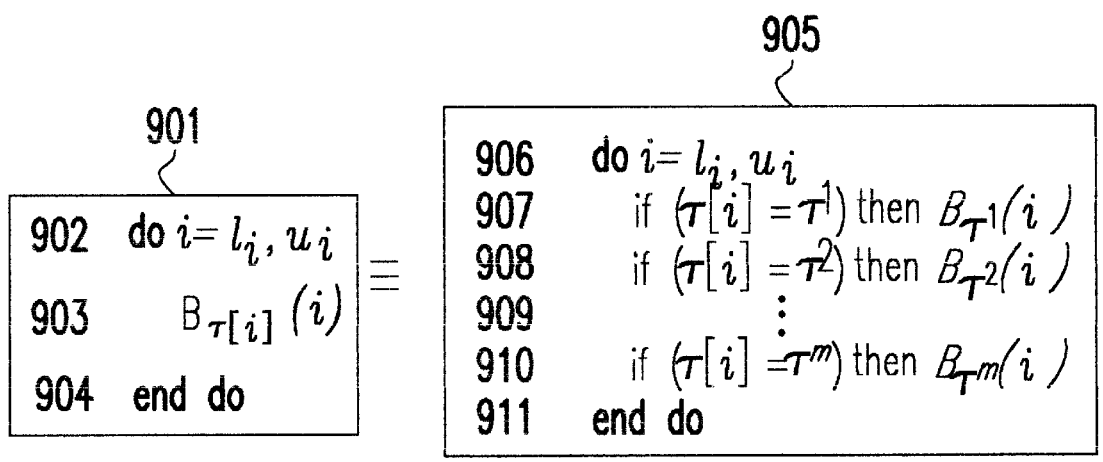
FIG. 9 illustrates how to implement a loop with multiple body versions.
FIG. 10 is a schematic illustration of the layout of the $\mathcal{R}$ vector, which defines the regions for an iteration space.

For reasons of performance, it is appropriate to group together iterations of the iteration space that have similar characteristics. A region of an iteration space is defined as a sequence of consecutive iterations of a loop that perform the same tests. That is, if iterations $i_1$ and $i_2$ belong to the same region, then $\tau[i_1]=\tau[i_2]$. The iteration space of a loop can be divided into n regions, represented by a vector $\mathcal{R}[1:n]$ of regions, with each region identified by a triple:

$$\mathcal{R}[\delta]=(\mathcal{R}[\delta].l, \mathcal{R}[\delta].u, \mathcal{R}[\delta].\tau), \delta=1,\ldots,n \qquad (7)$$

where $\mathcal{R}[\delta].1$ is the first iteration of region $\delta$, $\mathcal{R}[\delta].u$ is the last iteration of region $\delta$ and $\mathcal{R}[\delta].\tau$ is the vector of tests for all iterations in region $\delta$. The structure of vector $\mathcal{R}[1:n]$ is shown in FIG. 10. Using this partitioning of the iteration space into regions, the loop $L(i, l_i, u_i, B(i))$ can be transformed as follows:

$$\begin{array}{cc} & do\ \delta = 1, n \\ do\ i = l_i, u_i & \quad do\ i = \mathcal{R}[\delta] \cdot l, \mathcal{R}[\delta] \cdot u \\ \quad B(i) & \quad \Rightarrow\ B_{\mathcal{R}[\delta].\tau}(i) \end{array}$$

```
end do          end do
                end do
```

A partitioning can have any number of empty regions. A region $\mathcal{R}[\delta]$ is empty if $\mathcal{R}[\delta].l > \mathcal{R}[\delta].u$. Given a partitioning vector with empty regions, we can form an equivalent partitioning vector with only nonempty regions by removing the empty regions from the first vector. From now on, we consider only partitioning vectors for which every region is nonempty.

For a partitioning vector $\mathcal{R}[1:n]$ to be valid, the following conditions must hold:

1. The first iteration of region $\mathcal{R}[\delta+1]$ must be the iteration immediately succeeding the last iteration of region $\mathcal{R}[\delta]$ in execution order, for $\delta=1, \ldots, n-1$. We can express this requirement as:

$$\mathcal{R}[\delta+1].l = \mathcal{R}[\delta].u+1. \qquad (8)$$

2. The first iteration of $\mathcal{R}[1]$ must be the first iteration, in execution order, of the iteration space. We can express this requirement as:

$$\mathcal{R}[1].l = l_i. \qquad (9)$$

3. The last iteration of $\mathcal{R}[n]$ must be the last iteration, in execution order, of the iteration space. We can express this requirement as:

$$\mathcal{R}[n].u = u_i. \qquad (10)$$

4. The test for array reference $A_j[\sigma_j]$ in region $\mathcal{R}[\sigma]$, as defined by the test vector $\mathcal{R}[\delta].\tau$, has to be greater than or equal to the minimum test for each outcome of reference $A_j[\sigma_j]$ in region $\mathcal{R}[\delta]$. We can express this requirement as:

$$\mathcal{R}[\delta] \cdot \tau_j \geq \max_{i=\mathcal{R}[\delta].l}^{\mathcal{R}[\delta].u} (\tau_{\min}(\chi_j[i])). \qquad (11)$$

Note that there are many legal partitionings of an iteration space (infinite, if empty regions are used). In particular, given a valid partitioning vector $\mathcal{R}[1:n]$, it is legal to move the first iteration of a region $\mathcal{R}[\delta]$ to the preceding region $\mathcal{R}[\delta-1]$ provided that:

1. Region 1$\mathcal{R}[\delta-1]$ exists. That is, $\delta=2, \ldots, n$.
2. The test vector $\mathcal{R}[\delta-1].\tau$ is greater than or equal to the test vector $\mathcal{R}[\delta].\tau$. That is, $\mathcal{R}[\delta-1].\tau_j \geq \mathcal{R}[\delta].\tau_j$, for $j=1, \ldots, 92$.

Conversely, given a valid partitioning vector $\mathcal{R}[1:n]$, it is legal to move the last iteration of a region $\mathcal{R}[\delta]$ to the succeeding region $\mathcal{R}[\delta+1]$ provided that:

1. Region $\mathcal{R}[\delta+1]$ exists. That is, $\delta=1, \ldots, n-1$.
2. The test vector $\mathcal{R}[\delta+1].\tau$ is greater than or equal to the test vector $\mathcal{R}[\delta].\tau$. That is, $\mathcal{R}[\delta].\tau_j \geq \mathcal{R}[\delta].\tau_j$, for $j=1, \ldots, \sigma$.

These rules can be applied repeatedly to allow multiple iterations to be moved from one region to another.

The partitioning of most interest is what we call the minimum partitioning, which has the minimum number of regions. This partitioning is obtained when all the nonempty regions $\mathcal{R}[\delta]$ are maximal in size. A region $\mathcal{R}[\delta]=(\mathcal{R}[\delta].l, \mathcal{R}[\delta].u, \mathcal{R}[\delta].\tau)$ is maximal in size if $\tau[\mathcal{R}[\delta].l-1] \neq \mathcal{R}[\delta].\tau$ and $\tau[\mathcal{R}[\delta].u+1] \neq \mathcal{R}[\delta].\tau$. That is, if the region can not be enlarged by adding preceding or succeeding iteration, then the region is maximal in size. Note that $\tau[l_i-1]$ and $\tau[u_i+1]$ are undefined and therefore different from any $\mathcal{R}[\delta].\tau$. The minimum partitioning may contain regions that could be shown to be empty at run-time or with extensive compile-time analysis, but cannot be shown empty at compile-time or with naive compile-time analysis.

The vector of tests for array references in a loop execution (represented by matrix T) is defined by function $\xi(X,j,i)$. The matrix T defines which versions of the loop body need to be generated. Depending on when code generation occurs, different levels of information are available about the spaces which form the domain and range of the function $\xi(X,j,i)$ for a particular execution of the loop. The $\xi(X,j,i)$ function is a mapping from the space of outcomes(X), array references, and the loop iteration space into the space of tests (T). Of the inputs, or domain, only the space of array references can generally be precisely known from a naive examination of the source code of the program. Without further analysis of the program, the space of the vector of outcomes is assumed to contain all possible vectors of outcomes, and the integer space forming the loop iteration space is bounded only by language limits on the iteration space.

Standard analytic techniques such as constant propagation (S. Muchnick, *Advanced Compiler Design and Implementation*, Morgan Kaufmann Publishers, 1997) and range analysis (W. Blum and R. Eigenmann, "Symbolic range propagation", *Proceedings of the 9th International Parallel Processing Symposium*, April 1995) can be used to more precisely compute the iteration space that partially forms the domain of the $\xi(X,j,i)$ function. Analysis may also show that some vectors of outcomes are not possible. For example, if the loop lower bound is known, the array lower bound is known, and all terms in array references that do not depend on the loop control variable are known, it may be possible to show, by examining the source code, that no lower bounds violations will be in the vector of outcomes. More aggressive symbolic analysis can be used to show that no consistent solution exists for some combinations of outcomes. For example, it may be possible to show that a lower bound violation of $A_1$ and an upper bound violation of $A_2$ are inconsistent for the same value of the loop index variable i. When more complete information is available to the algorithms computing regions, more precise region generation (closer to a minimum partitioning) is possible. More information can be made available by delaying the computation of regions until run-time (using the inspector-executor and other techniques described below) or until load-time (using dynamic or just-in-time compilation) (J. Auslander, M. Philiopose, C. Change, S. Eggers, and B. Bershad, "Fast effective dynamic compilation", *Proceedings of the ACM SIGPLAN '96 Conference on Programming Language Design and Implementation*, pp. 149–159, Philadelphia, Pa., 21–24 May 1996).

The following algorithm (procedure inspector) shows the implementation of an inspector that computes the minimum partitioning of an iteration space. The inspector collapses the computation of the outcome vector $\chi[i]$, the test vector $\tau[i]$, and the actual partitioning. For each reference $A_j[\sigma_j]$, the inspector verifies the outcome $\chi_j[i]$ of the reference and immediately computes $\tau_j[i]$. The particular inspector shown implements $\xi(X,j,i) = \tau_{min}(\chi_j[i])$, but any legal $\xi(X,j,i)$ function could be used. After building the vector $\tau$ for iteration i, the inspector checks if this $\tau$ is different from the test vector $\bar{\tau}$ of the current region. The inspector either starts a new region or adds iteration i to the current region.

```
procedure inspector (R,n,l_i,u_i,(A_j[σ_j],j=1, ..., ρ))
    n=0
    τ̄=undefined
    do i=l_i,u_i
        do j=1,ρ
            τ_j=no test
            if (A_j=null) τ_j=null test
            elsif (σ_j<lo(A_j))τ_j=lb test
            elsif (σ_j>up(A_j))τ_j=ub test
            end if
        end do
        if (τ=τ̄) then
            R[n].u=i
        else
            n=n+1
            R[n]=(i,i,τ)
            τ̄=τ
        end if
    end do
end procedure
```
An inspector to construct the minimum partitioning of an iteration space.

Figure 11:
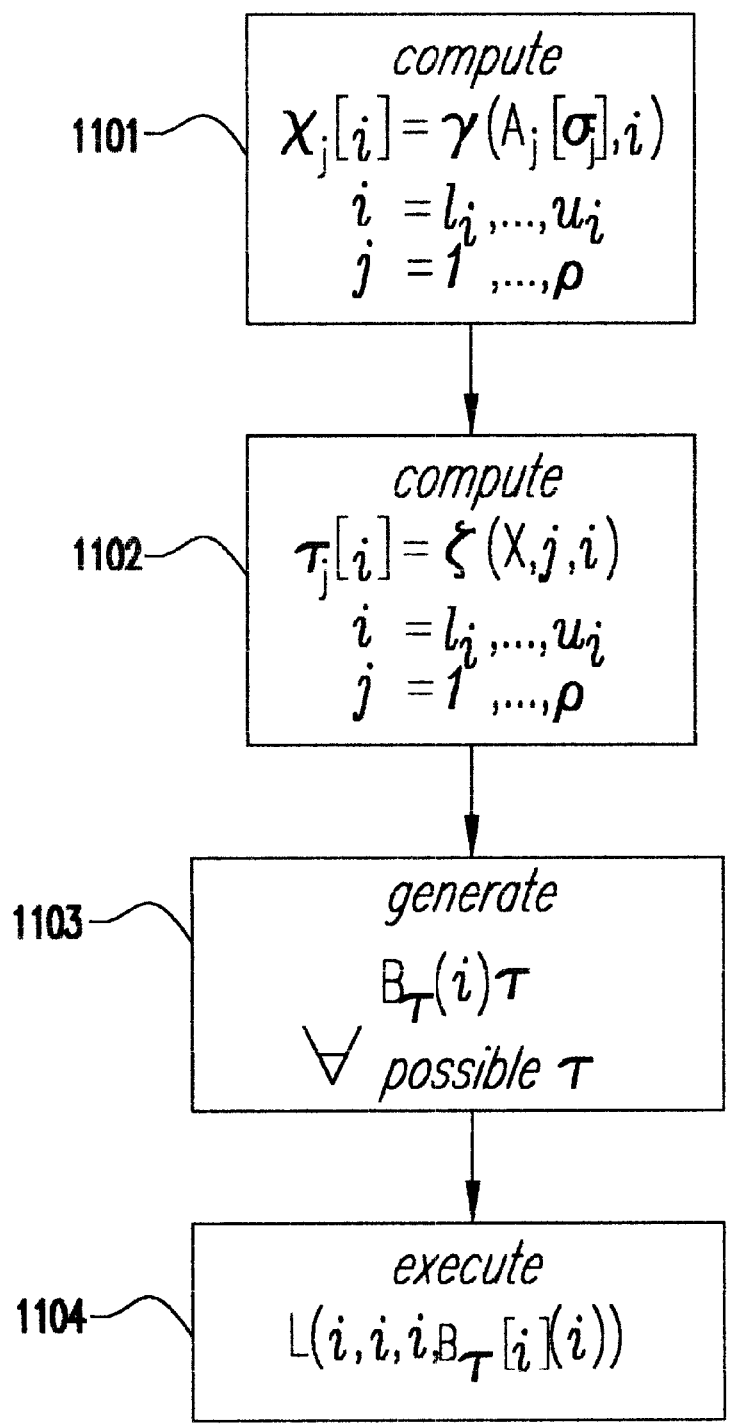
FIG. 11 is a flow chart of a process to transform loops in a program, the transformation adding the necessary explicit checks before each array reference to detect violations.

An embodiment of the invention to optimize array reference tests for a loop $L(i,l_i,u_i,B(i))$ is shown in FIG. 11. Outcomes for each array reference of a loop are computed in 1101 of FIG. 11. Tests for each array reference of a loop are computed in 1102 of FIG. 11. The different versions of the loop body $B_\tau(i)$ are generated in 1103 of FIG. 11 for all possible values of $\tau$. Execution of loop $\bar{L}(i,l_i,u_i,B_{\tau[i]}(i))$ in 1104 of FIG. 11 completes the process.

Based solely on the list of primitive tests of FIG. 3, there are $5^\rho$ different versions of a loop body with $\rho$ array references $A_j[\sigma_j]$. We arrive at this number because for each $A_j[\sigma_j]$ there are five possible tests (FIG. 3): no test, null test, lb test, ub test, and all tests. However, the choice of a function $\xi(X,j,i)$ naturally limits the test vectors that can be generated. The particular inspector shown never generates an all tests, and therefore only $4^\rho$ different versions of the loop body are possible.

Summarizing, the process of optimizing the array access checks in a loop involves:
1. Using a function $\gamma(A_j[\sigma_j],i)$ to compute matrix X where $X[i][j]=\chi_j[i]$ is the outcome of reference $(A_j[\sigma_j]$ in iteration i (1101 in FIG. 11).
2. Using a function $\xi(X,j,i)$ to compute vector T where $T[i][j]=\tau_j[i]$ is the test to be performed before reference $(A_j[\sigma_j]$ in iteration i (1102 in FIG. 11).
3. Generating the necessary versions $B_\tau(i)$ of body B(i) (1103 in FIG. 11).
4. Executing the appropriate version $B_{\tau[i]}(i)$ in each iteration i of loop $L(i,l_i,u_i,B(i))$ (1104 in FIG. 11).

Figure 12:
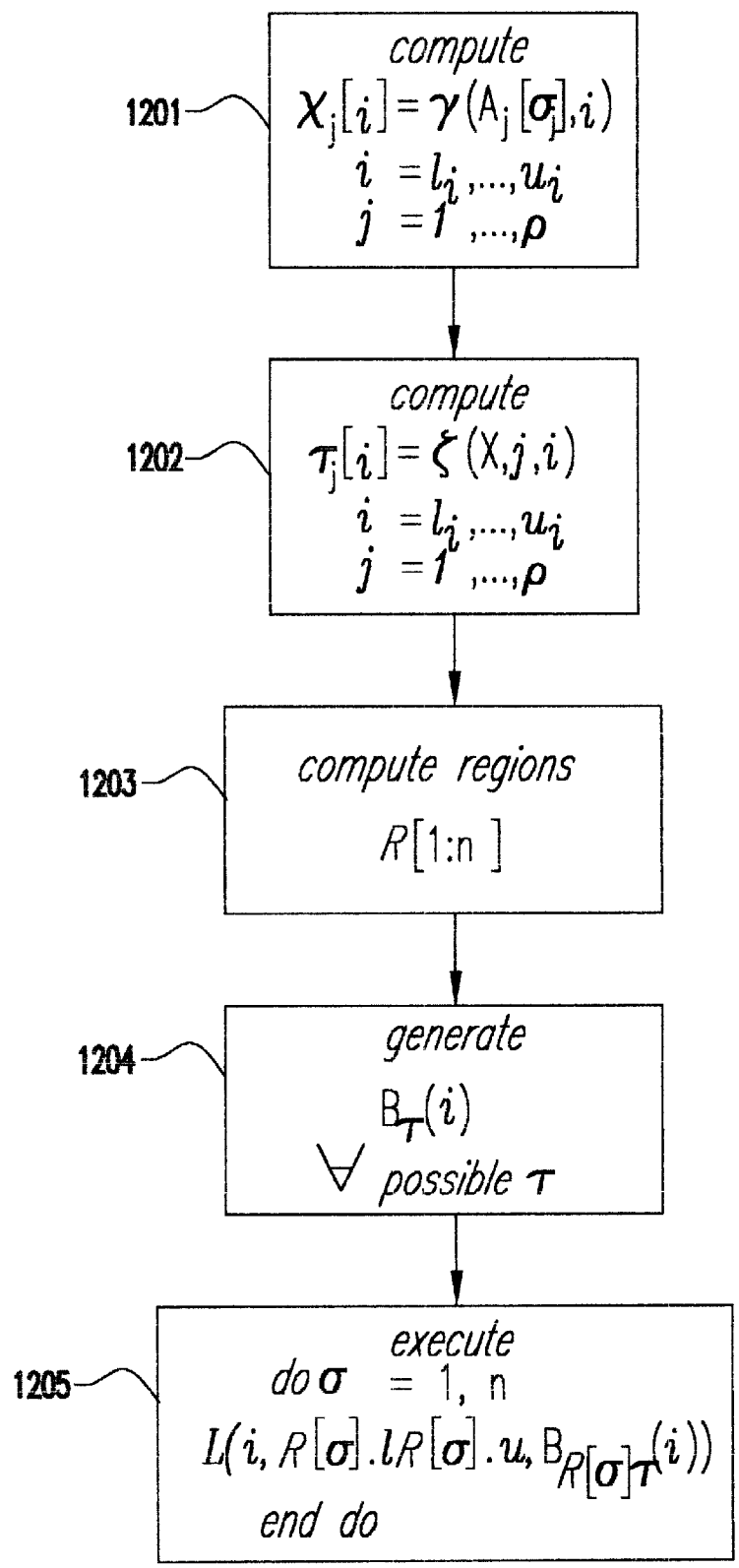
FIG. 12 is a flow chart showing a variation of the process in FIG. 11 where iterations of the loop are grouped into regions.
Figure 13:
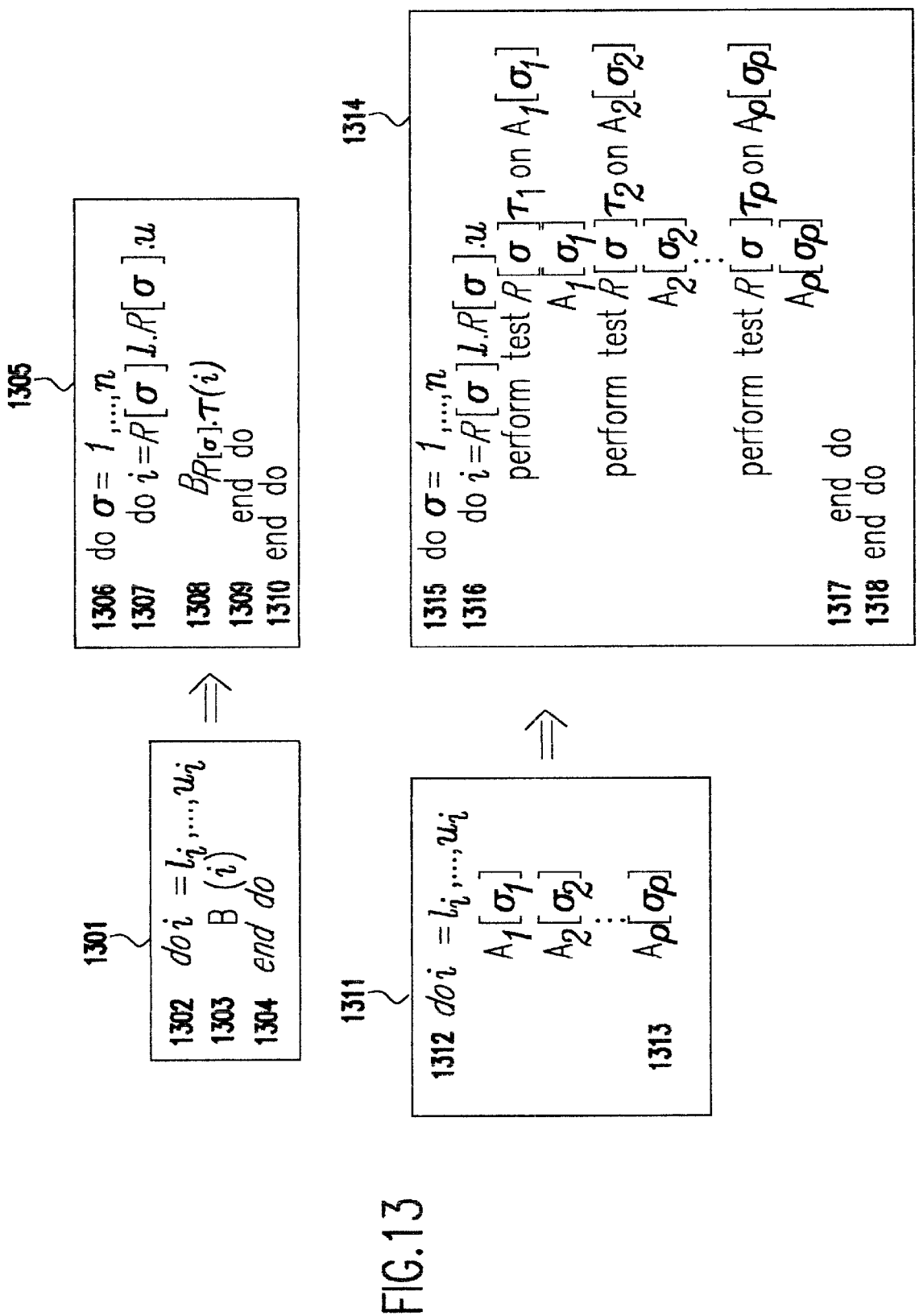
FIG. 13 illustrates the result of applying the transformation of FIG. 12 to loop 1301(1311 in detailed format), the resulting loop being shown in 1305(1314 in detailed format)

The process for optimizing array reference tests using regions is shown in FIG. 12. The main differences between this process and that of FIG. 11 are in the computation of regions 1203 and in the execution of loop 1205. The transformation used to execute the loop in 1205 is shown in FIG. 13. The original loop 1301 (shown in more detail in 1311) is transformed into loop 1305 (shown in more detail in 1314). Driver loop 1315 iterates over the regions, and loop 1316 executes the iterations for each region. Execution of 1314 corresponds to performing 1205 in FIG. 12. Again, the loop body versions can be generated either dynamically or statically. Static generation can be performed following the patterns shown in FIG. 14 and FIG. 15, as explained next.

Let there be m distinct values for the test vectors $\mathcal{R}[1].\tau$, $\mathcal{R}[2].\tau, \ldots, \mathcal{R}[n].\tau$. We label these test vectors $\tau^1, \tau^2, \ldots, \tau^m$. We need to generate m versions of the loop body, $B_{\tau^1}(i), B_{\tau^2}(i), \ldots, B_{\tau^m}(i)$, one for each possible test vector $\tau$. In FIG. 14, m different loops of the form do i=$\mathcal{R}[\delta].l, \mathcal{R}[\delta].u$
    $B_{\tau^k}(i)$
end do are instantiated, one for each version of $\tau^k$, k=1, ..., m. These loops are shown in 1410, 1415, and 1421. The loops are guarded by their respective if-statements (1409, 1414, and 1420) that select only one loop for execution in each iteration of the driver loop 1408.

An alternative is shown in FIG. 15. Again, m different loops of the form do i=$l^k(\delta), u^k(\delta)$
    $B_{\tau^k}(i)$
end do are instantiated, one for each version of $\tau^k$, k=1, ..., m. These loops are shown in 1509, 1512, and 1516. To guarantee that only one of the loops executes in each iteration of the driver loop 1508, we define:

$$l_k(\delta) = \begin{cases} \mathcal{R}[\delta] \cdot l & \text{if } \mathcal{R}[\delta] \cdot \tau = \tau^k \\ 0 & \text{if } \mathcal{R}[\delta] \cdot \tau \neq \tau^k \end{cases} \quad (12)$$

$$u_k(\delta) = \begin{cases} \mathcal{R}[\delta] \cdot u & \text{if } \mathcal{R}[\delta] \cdot \tau = \tau^k \\ -1 & \text{if } \mathcal{R}[\delta] \cdot \tau \neq \tau^k \end{cases} \quad (13)$$

This method of partitioning the iteration space of a loop into regions and implementing each region with code that tests for at least the array violations that occur in that region constitute our method for optimizing array reference tests during the execution of a loop while preserving the semantics of the loop. It is important to note that this method can be applied to each loop in a program or program fragment independently. FIG. 16 illustrates the method as applied to both loops 1602 and 1604 of a doubly nested loop structure 1601. The resulting structure is shown in 1609. $\mathcal{R}_1$ is the regions vector for loop 1602, and $\mathcal{R}_2$ is the regions vector for loop 1604. Note that the versions $S^1(i_1)$ and $S^2(i_1)$ in 1609 (1612 and 1618) are controlled just by $\mathcal{R}_1$, while the versions of the loop body $B(i_1, i2)$ (1615) is controlled both by $\mathcal{R}_1$ and $\mathcal{R}_2$. The actual implementation of 1609 can use any combination of the methods in FIG. 14 and FIG. 15. FIG. 17 shows an implementation using the method of FIG. 14 for both loops.

In some situations, it may be possible to directly compute $\chi_j[i]$ and $\tau_j[i]$ for a reference $A_j[\sigma_j]$ and all values of i. When this is the case, the reference $A_j[\sigma_j]$ can be dropped from procedure inspector, and we can just make $\tau_j=\tau_j[i]$ in each iteration i. When $\tau_j[i]$ can be directly computed for all references $A_j[\sigma_j]$ and all values of i, the inspector becomes unnecessary. Stated differently, the role of the inspector is performed by direct computation.

Direct Computation of Outcomes

Consider an array reference of the form $A[f(i)]$ in the body B(i) of loop $L(i,l_i,u_i,B(i))$. Let the function $f(i)$ be either monotonically increasing or monotonically decreasing in the domain i=$l_i, \ldots, u_i$. (We later relax this constraint for some types of functions.) We use the notation lo(A) and up(A) to denote the lower and upper bounds of A respectively. For the method to work in all cases, we define lo(A)=0 and up(A)=−1 when A is null. The safe region of the iteration space of i with respect to an indexing operation A[$f$(i)] is the set of values of i that make $f$(i) fall within the bounds of A. That is, for all i in the safe region, the outcome $\chi$[i] of reference A[$f$(i)] is OK. Therefore, in the safe region we want:

$$lo(A) \leq f(i) \leq up(A), \forall i \in \text{safe region}.$$

If $f$(i) is monotonically increasing, the safe region is defined by:

$$\lceil f^{-1}(lo(A)) \rceil \leq i \leq \lfloor f^{-1}(up(A)) \rfloor. \tag{14}$$

Conversely, if $f$(i) is monotonically decreasing the safe region is defined by:

$$\lceil f^{-1}(up(A)) \rceil \leq i \leq \lfloor f^{-1}(lo(A)) \rfloor. \tag{15}$$

Equations (14) and (15) define the range of values of i that generate legal array indices for A. However, i must also lie between the loop bounds $l_i$ and $u_i$.

In general, we want:

$$\mathcal{L}(f(.),A) \leq i \leq \mathcal{U}(f(.),A)$$

where $$\mathcal{L}(f(.), A) = \tag{16}$$
$$\begin{cases} \max(l_i, \lceil f^{-1}(lo(A)) \rceil) & \text{if } f \text{ monotonically increasing} \\ \max(l_i, \lceil f^{-1}(up(A)) \rceil) & \text{if } f \text{ monotonically decreasing} \end{cases}$$

and $$\mathcal{U}(f(.), A) = \tag{17}$$
$$\begin{cases} \min(u_i, \lfloor f^{-1}(up(A)) \rfloor) & \text{if } f \text{ monotonically increasing} \\ \min(u_i, \lfloor f^{-1}(lo(A)) \rfloor) & \text{if } f \text{ monotonically decreasing} \end{cases}$$

$\mathcal{L}(f(.),A)$ and $\mathcal{U}(f(.),A)$ are, respectively, the safe lower bound and safe upper bound of the iteration space of i with respect to A[$f$(i)]. If $\mathcal{L}(f(.),A) > \mathcal{U}(f(.),A)$, then the safe region of the iteration space of i with respect to A[$f$(i)] is empty. If $\mathcal{L}(f(.),A) \leq \mathcal{U}(f(.),A)$, then these safe bounds partition the iteration space into three regions: (i) the region from $l_i$ to $\mathcal{L}(f(.),A)-1$, (ii) the safe region from $\mathcal{L}(f(.),A)$ to $\mathcal{U}(f(.),A)$, and (iii) the region from $\mathcal{U}(f(.),A)+1$ to $u_i$. Any one of regions (i), (ii), and (iii) could be empty. We can compute the outcome $\chi$[i] of array reference A[$f$(i)] in each of these regions:

if $f$(i) is monotonically increasing, $$\chi[i] = \begin{cases} < & l_i \leq i \leq \mathcal{L}(f(.), A) - 1 \\ OK & \mathcal{L}(f(.), A) \leq i \leq \mathcal{U}(f(.), A) \\ > & \mathcal{U}(f(.), A) + 1 \leq i \leq u_i \end{cases} \tag{18}$$

if $f$(i) is monotonically decreasing, $$\chi[i] = \begin{cases} > & l_i \leq i \leq \mathcal{L}(f(.), A) - 1 \\ OK & \mathcal{L}(f(.), A) \leq i \leq \mathcal{U}(f(.), A) \\ < & \mathcal{U}(f(.), A) + 1 \leq i \leq u_i \end{cases} \tag{19}$$

If the body B(i) has $\rho$ indexing operations on i, of the form $A_1[f_1(i)], A_2[f_2(i)], \ldots, A_\rho[f_\rho(i)]$, we can compute $\mathcal{L}(f_j(.), A_j)$ and $\mathcal{U}(f_j(.), A_j)$ ($1 \leq i \leq \rho$) using Equations (16) and (17).

From there, we can compute the outcome $\chi_j$[i] for each reference $A_j[f_j(i)]$ and iteration i using Equations (18) and (19). Next, we discuss how to actually compute $\mathcal{L}(f(.),A)$ and $\mathcal{U}(f(.),A)$ in the case of some common subscript functions.

Linear Subscripts

In the particular case of a linear subscript function of the form $f$(i)=ai+b, the inverse function $f^{-1}$ can be easily computed:

$$f^{-1}(i) = \frac{i-b}{a}. \tag{20}$$

Also, the monotonicity of $f$(i) is determined from the value of a: if a>0, then $f$(i) is monotonically increasing, and if a<0, then $f$(i) is monotonically decreasing. Note that the values of a and b need not be known at compile time, since $\mathcal{L}(f(.),A)$ and $\mathcal{U}(f(.),A)$ can be efficiently computed at run-time.

Affine Subscripts

Consider the d-dimensional loop nest

```
do i₁ = l_{i₁}, u_{i₁}
  do i₂ = l_{i₂}, u_{i₂}
    ...
      do i_d = l_{i_d}, u_{i_d}
        B(i₁, i₂, ..., i_d)
      end do
    ...
  end do
end do.
```

Let there be an array reference $A[f(i_1, i_2, \ldots, i_d)]$ in the body of $B(i_1, i_2, \ldots, i_d)$. Let the subscript be an affine function of the form $f(i_1, i_2, \ldots, i_d) = a_1 i_1 + a_2 i_2 + \ldots + a_d i_d + b$, where $i_1, i_2, \ldots, i_d$ are loop index variables, and $a_1, a_2, \ldots, a_d$, b are loop invariants. At the innermost loop ($i_d$) the values of $i_1, i_2, \ldots, i_{d-1}$ are fixed, and $f(.)$ can be treated as linear on $i_d$. Determination of safe bounds for the $i_1, i_2, \ldots, i_{d-1}$ loops can be done using the inspector/executor method described above. Alternatively, these safe bounds can be approximated. Replacing true safe bounds $\mathcal{L}(f(.),A)$ and $\mathcal{U}(f(.),A)$ by approximated safe bounds $\underline{\mathcal{L}}$ and $\underline{\mathcal{U}}$ does not introduce any hazards as long as $\underline{\mathcal{L}} \geq \mathcal{L}(f(.),A)$ and $\underline{\mathcal{U}} \leq \mathcal{U}(f(.),A)$. Techniques for approximating the iteration subspace of a loop that accesses some range of an affinely subscripted array axis are described in S. P. Midkiff, "Computing the local iteration set of block-cyclically distributed reference with affine subscripts", *Sixth Workshop on Compilers for Parallel Computing*, 1996, and K. van Reeuwijk, W. Denissen, H. J. Sips, and E. M. R. M. Paalvast, "An implementation framework for HPF distributed arrays on message-passing parallel computer systems", *IEEE Transactions on Parallel and Distributed Systems*, 7(9):897–914, September 1996.

Constant Subscripts

For an array reference A[$f$(i)] where $f$(i)=k (a constant), $f$(i) is neither monotonically increasing nor monotonically decreasing. Nevertheless, we can treat this special case by defining $$\mathcal{L}(k, A) = \begin{cases} l & \text{if } (lo(A) \le k \le up(A)), \\ \max(l, u+1) & \text{otherwise} \end{cases}$$

$\mathcal{U}(k,A) = u$.

Basically, the safe region for reference A[k] is either the whole iteration space, if k falls within the bounds of A, or empty otherwise.

Modulo-function Subscripts

Another common form of array reference is A[$f(i)$] where $f(i) = g(i) \bmod m + ai + b$. In general, this is not a monotonic function. However, we know that the values of $f(i)$ are within the range described by $ai+b+j$, for $i=l_i, l_i+1, \ldots, u_i$ and $j=0,1,\ldots,m-1$. We define a function $h(i,j)=ai+b+j$. Let $h_{max}$ be the maximum value of $h(i,j)$ in the domain $i=l_i, l_i+1, \ldots, u_i$ and $j=0,1,\ldots,m-1$. Let $h_{min}$ be the minimum value of $h(i,j)$ in the same domain. These extreme values of $h(i,j)$ can be computed using the techniques described by Utpal Banerjee, in "Dependence Analysis", *Loop Transformations for Restructuring Compilers*, Kluwer Academic Publishers, Boston, Mass., 1997. Then we can define $$\mathcal{L}(f(i), A) = \begin{cases} l_i & \text{if } ((lo(A) \le h_{min}) \wedge (up(A) \ge h_{max})), \\ \max(l_i, u_i + 1) & \text{otherwise,} \end{cases}$$

$\mathcal{U}(f(i), A) = u_i$.

That is, the safe region is the whole iteration space if we can guarantee that $f(i)$ is always within the bounds of A, or empty otherwise.

Known Subscript Range

All the previous functions are particular cases of subscript functions for which we can compute their range of values. If for an array reference A[$f(i)$] we know, by some means, that $h_{min} \le f(i) \le h_{max}$, then we can define $$\mathcal{L}(f(i), A) = \begin{cases} l_i & \text{if } ((lo(A) \le h_{min}) \wedge (up(A) \ge h_{max})), \\ \max(l_i, u_i + 1) & \text{otherwise,} \end{cases}$$

$\mathcal{U}(f(i), A) = u_i$.

That is, the safe region is the whole iteration space if we can guarantee that $f(i)$ is always within the bounds of A, or empty otherwise.

If the subscript function is not one of the described cases, then the more general inspector/executor method described above should be used to determine the outcomes of an array reference A[$\sigma$]. This method also lifts the restriction on function $f(.)$ being monotonically increasing or decreasing.

Application of Direct Computation of Outcomes

Let there be $\rho$ array references $A_j[\rho_i]$ in the body B(i) of a loop L(i,$l_i$,$u_i$,B(i)). Consider the case where all $\rho$ references are of the form $A_j[f_j(i)], 1 \le j \le \rho$ and $f_j(i)$ is such that we can compute $\mathcal{L}(f_j(.),A_j)$ and $\mathcal{U}(f_j(.),A_j)$ as described above. Therefore, we can directly compute $\chi_j[i]$ for any j and i. Moreover, there are only three possible values for an outcome $\chi_j[i]$:(<,OK,>). We number these outcomes 0, 1, and 2, respectively. Note that there are $3^\rho$ possible values for $\chi[i]$. Two arrays L[1:$\rho$][0:2] (for lower bounds) and U[1:$\rho$]

[0:2] (for upper bounds) are formed. Element L[i][j] contains the upper bound of loop indices that lead to outcome j at reference i. Element U[i][j] contains the upper bound of loop indices that lead to outcome j at reference i. Elements L[i][j] and U[i][j] can be computed using:

$$L[j][0] = \begin{cases} l_i & \text{if } f(i) \text{ monotonically increasing,} \\ \mathcal{U}(f_j(.), A_j) + 1 & \text{if } f(i) \text{ monotonically decreasing,} \end{cases} \quad (21)$$

$$U[j][0] = \begin{cases} \mathcal{L}(f_j(.), A_j) - 1 & \text{if } f(i) \text{ monotonically increasing,} \\ u_i & \text{if } f(i) \text{ monotonically decreasing,} \end{cases} \quad (22)$$

$$L[j][1] = \mathcal{L}(f_j(.), A_j), \quad (23)$$

$$U[j][1] = \mathcal{U}(f_j(.), A_j), \quad (24)$$

$$L[j][2] = \begin{cases} \mathcal{U}(f_j(.), A_j) + 1 & \text{if } f(i) \text{ monotonically increasing,} \\ l_i & \text{if } f(i) \text{ monotonically decreasing,} \end{cases} \quad (25)$$

$$U[j][2] = \begin{cases} u_i & \text{if } f(i) \text{ monotonically increasing,} \\ \mathcal{L}(f_j(.), A_j) - 1 & \text{if } f(i) \text{ monotonically decreasing.} \end{cases} \quad (26)$$

Outcome types on a particular reference divide the iteration space into three disjoint segments (regions). Therefore, outcome types for all $\rho$ references divide the iteration space into $3^\rho$ disjoint regions ($3^\rho$ is the number of possible values for $\chi[i]$). Let $\xi_j(\delta)$ denote the $j^{th}$ digit of the radix-3 representation of $\delta$. We can form a vector $\mathcal{R}[1:3^\rho]$ of all possible regions, where $\mathcal{R}[\delta]$ is the region with outcome $\xi_j(\delta)$ for reference $A_j[f_j(i)]$. The tests performed in this region are the minimum necessary to detect array access violations, according to the outcome. The region $\mathcal{R}[\delta]$ can be computed as:

$$\mathcal{R}[\delta] \cdot l = \max_{j=1}^{\rho}(L[j][\xi_j(\delta)]), \quad (27)$$

$$\mathcal{R}[\delta] \cdot u = \min_{j=1}^{\rho}(U[j][\xi_j(\delta)]), \quad (28)$$

$$\mathcal{R}[\delta].\tau = (\tau_{min}(\xi_1(\delta)), \tau_{min}(\xi_2(\delta)), \ldots, \tau_{min}(\xi_\rho(\delta))). \quad (29)$$

Vector $\mathcal{R}$ cannot be used directly in 1314 of FIG. 13 because the regions are not necessarily ordered by increasing iteration number. Therefore, we compute vector $\mathcal{R}$ by sorting $\mathcal{R}[\delta]$ on its l field:

$$\mathcal{R}[1:3\rho] = \mathcal{R}[1:3^\rho] \text{ sorted in ascending order of l.} \quad (30)$$

This vector $\mathcal{R}$ can now be used in 1314 to execute the loop.

The next method is a variant of the method for optimizing array reference tests during the execution of a loop while preserving the semantics of the loop described above in which only the versions of the loop body B(i) that might actually be executed are generated. In particular, versions of the loop body B(i) are generated only for those regions described in the previous section for which it cannot be shown by data flow and symbolic analysis that $\mathcal{R}[\delta].l > \mathcal{R}[\delta].u, 1 \le \delta \le 3^\rho$. We use the same notation developed above. An embodiment of the method is shown in FIG. 18.

Figure 18:
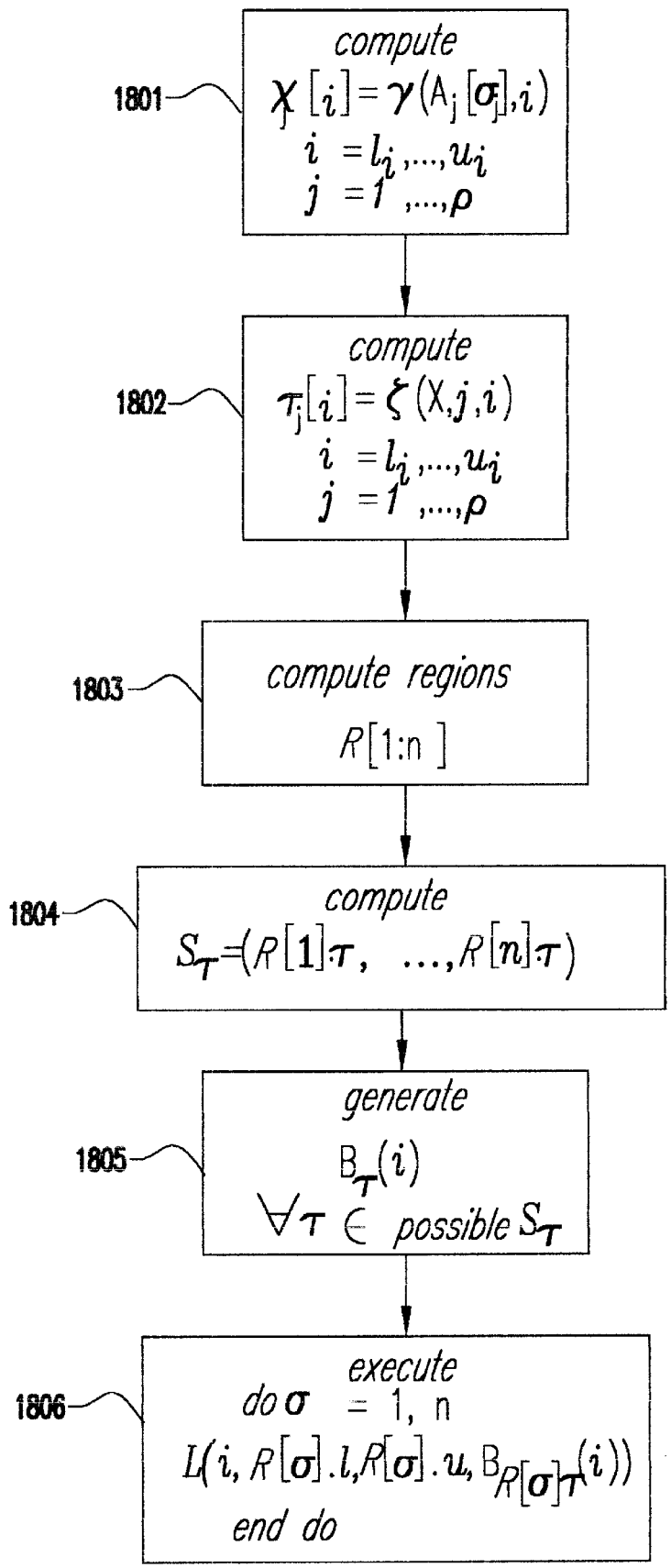
FIG. 18 is a flow chart showing a variation of the process in FIG. 12 in which only the versions of the loop body actually used during execution of the loop are generated.

FIG. 18 shows the process by which the necessary versions of the loop are generated. Computation of $\chi_j[i]$ (shown in 1801) and $\tau_j[i]$ (shown in 1802) for $i=l_i, \ldots, u_i, j=1, \ldots, \rho$ takes place as in FIG. 12. The computation of the regions vector $\mathcal{R}[1:n]$ (shown in 1803) is done as before, except as noted below. In step 1804, the set $S_\tau$ of tests for each iteration is computed, and in step 1805, a loop body $B_\tau(i)$ is generated for each unique $\tau$ in set $S_\tau$. It is the action of steps 1803, 1804 and 1805 that distinguish this variant from the section entitled "Specializing the Method for Loops" disclosed above. In particular, step 1803 is implemented using data flow and symbolic analysis to more accurately determine non-empty regions. In steps 1804 and 1805, the regions so identified are generated. Finally, in step 1806, the transformed version of loop $L(i,l_i,u_i,B(i))$ is executed.

Computing a Safe Region for the Iteration Space

We have shown above how to compute the safe bounds of a loop with respect to an array reference $A[f(i)]$. If the body $B(i)$ has $\rho$ indexing operations on $i$, of the form $A_1[f_1(i)]$, $A_2[f_2(i)]$, ..., $A_\rho[f_\rho(i)]$, we can compute $\mathcal{L}(f_j(.),A_j)$ and $\mathcal{U}(f_j(.),A_j)(1 \leq j \leq \rho)$ using Equations (16) and (17) (or one of the other variations described above). The safe range for $i$, with respect to all references, is between the maximum of all $\mathcal{L}(f_j(.),A_j)$ and the minimum of all $\mathcal{U}(f_j(.),A_j)$:

$$\mathcal{L}^s = \max_{j=1}^{\rho}(\mathcal{L}(f_j(.), A_j)), \tag{31}$$

$$\mathcal{U}^s = \min_{j=1}^{\rho}(\mathcal{U}(f_j(.), A_j)), \tag{32}$$

where the safe region of the iteration space is defined by $i = \mathcal{L}^s, \mathcal{L}^s+1, \ldots, \mathcal{U}^s$. For values of $i$ in this region, we are guaranteed that any array reference $A_j[f_j(i)]$ will not cause a violation. If $\mathcal{L}^s > \mathcal{U}^s$, then this region is empty. Note that the safe region, as defined by $\mathcal{L}^s$ and $\mathcal{U}^s$, corresponds to region $\mathcal{R}[1_1 \ldots 1_3]$ defined above:

$$\mathcal{L}^s = \mathcal{R}[1_1 \ldots 1_3].l \tag{33}$$
$$\mathcal{U}^s = \mathcal{R}[1_1 \ldots 1_3].u \tag{34}$$

To extract loop bounds that we can use in our methods, we define two operators, $\Psi_l$ and $\Psi u$:

$$(l^s,\tau^l) = \Psi_l(l_i,u_i,\mathcal{L}^s,\mathcal{U}^s,(f_1(.), \ldots ,f_\rho(.))),$$
$$(u^s,\tau^u) = \Psi_u(l_i,u_i,\mathcal{L}^s,\mathcal{U}^s,(f_1(.), \ldots ,f_\rho(.))),$$

where $l^s$ is the lower safe bound and $u^s$ is the upper safe bound for the entire iteration space of $i$. We want to generate $l^s$ and $u^s$ such that they partition the iteration space into three regions: (i) a region from $l$ to $l^s-1$, (ii) a region from $l^s$ to $u^s$, and (iii) a region from $u^s+1$ to $u$. Region (ii) has the property that no run-time checks are necessary. The operators $\Psi_l$ and $\Psi_u$ also produce two vectors, $\tau^l$ and $\tau^u$, with $\rho$ elements each. The element $\tau^l(j)$ defines the type of run-time check that is necessary for reference $A_j[f_j(i)]$ in region (i).

Correspondingly, the element $\tau^u(j)$ defines the type of run-time check necessary for reference $A_j[f_j(i)]$ in region (iii). We consider the two possible cases for $\mathcal{L}^s$ and $\mathcal{U}^s$ separately.

$\mathcal{L}^s > \mathcal{U}^s$: In this case, the safe region of the loop is empty. We select $l^s = u+1$ and $u^s = u$, thus making region (i) equal to the whole iteration space and the other regions empty. The value of $\tau^u$ is irrelevant, and $\tau^l$ can be selected, for simplicity, to indicate that all checks need to be performed in all references.

$\mathcal{L}^s \leq \mathcal{U}^s$: In this case, there is a nonempty safe region, and we simply make $l^s = \mathcal{L}^s$ and $u^s = \mathcal{U}^s$. From the computation of the safe bounds, we derive that for values of $i$ less than $l^s$, accesses of the form $A[f(i)]$ can cause violations on the lower bound of $A$, if $f(i)$ is monotonically increasing, and on the upper bound of $A$, if $f(i)$ is monotonically decreasing. For values of $i$ greater than $u^s$ accesses of the form $A[f(i)]$ can cause violations on the upper bound of $A$, if $f(i)$ is monotonically increasing, and on the lower bound of $A$, if $f(i)$ is monotonically decreasing. The values of $\tau^l$ and $\tau^u$ have to reflect the necessary run-time checks.

Summarizing: We define operators $\Psi_l$ and $\Psi_u$ to compute:

$$l^s = \begin{cases} u+1 & \text{if } \mathcal{L}^s > \mathcal{U}^s, \\ \mathcal{L}^s & \text{if } \mathcal{L}^s \leq \mathcal{U}^s. \end{cases} \tag{35}$$

$$u^s = \begin{cases} u & \text{if } \mathcal{L}^s > \mathcal{U}^s, \\ \mathcal{U}^s & \text{if } \mathcal{L}^s \leq \mathcal{U}^s. \end{cases} \tag{36}$$

$$\tau^l_j = \begin{cases} \text{all tests} & \text{if } \mathcal{L}^s > \mathcal{U}^s \text{ and } (\mathcal{L}(f_j(.), A_j) > l_i \text{ or } \mathcal{U}(f_j(.), A_j) < u_i), \\ \text{no test} & \text{if } \mathcal{L}^s > \mathcal{U}^s \text{ and } (\mathcal{L}(f_j(.), A_j) \leq l_i \text{ and } \mathcal{U}(f_j(.), A_j) \geq u_i), \\ \text{lb test} & \text{if } \mathcal{L}^s \leq \mathcal{U}^s \text{ and } f_j(i) \text{ monotonically increasing and } \mathcal{L}(f_j(.), A_j) > l_i, \\ \text{no test} & \text{if } \mathcal{L}^s \leq \mathcal{U}^s \text{ and } f_j(i) \text{ monotonically increasing and } \mathcal{L}(f_j(.), A_j) \leq l_i, \\ \text{ub test} & \text{if } \mathcal{L}^s \leq \mathcal{U}^s \text{ and } f_j(i) \text{ monotonically decreasing and } \mathcal{L}(f_j(.), A_j) > l_i, \\ \text{no test} & \text{if } \mathcal{L}^s \leq \mathcal{U}^s \text{ and } f_j(i) \text{ monotonically decreasing and } \mathcal{L}(f_j(.), A_j) \leq l_i. \end{cases} \tag{37}$$

$$\tau^u_j = \begin{cases} \text{all tests} & \text{if } \mathcal{L}^s > \mathcal{U}^s \text{ and } (\mathcal{L}(f_j(.), A_j) > l_i \text{ or } \mathcal{U}(f_j(.), A_j) < u_i), \\ \text{no test} & \text{if } \mathcal{L}^s > \mathcal{U}^s \text{ and } (\mathcal{L}(f_j(.), A_j) \leq l_i \text{ and } \mathcal{U}(f_j(.), A_j) \geq u_i), \\ \text{ub test} & \text{if } \mathcal{L}^s \leq \mathcal{U}^s \text{ and } f_j(i) \text{ monotonically increasing and } \mathcal{U}(f_j(.), A_j) < u_i, \\ \text{no test} & \text{if } \mathcal{L}^s \leq \mathcal{U}^s \text{ and } f_j(i) \text{ monotonically increasing and } \mathcal{U}(f_j(.), A_j) \leq u_i, \\ \text{lb test} & \text{if } \mathcal{L}^s \leq \mathcal{U}^s \text{ and } f_j(i) \text{ monotonically decreasing and } \mathcal{U}(f_j(.), A_j) < u_i, \\ \text{no test} & \text{if } \mathcal{L}^s \leq \mathcal{U}^s \text{ and } f_j(i) \text{ monotonically decreasing and } \mathcal{U}(f_j(.), A_j) \leq u_i. \end{cases} \tag{38}$$

If $A_j$ is null in a reference $A_j[f_j(i)]$, then, according to our definition, $lo(A_j)=0$ and $up(A_j)=-1$. This, in turn, makes $\mathcal{L}(f_j(.),A_j) > \mathcal{U}(f_j(.),A_j)$ and consequently $\mathcal{L}^s > \mathcal{U}^s$. Therefore, if there is a nonempty safe region (i.e., $\mathcal{L}^s \leq \mathcal{U}^s$), then necessarily none of the pointers $A_j$ is null. This safe region needs neither run-time bounds tests nor run-time null pointer tests. In fact, if $\mathcal{L}^s \leq \mathcal{U}^s$, then null pointer tests are superfluous in the regions preceding and succeeding the safe region.

The method to optimize array reference tests works by partitioning the iteration space into regions of three different types: (i) regions that do not require any tests, (ii) regions which require tests as defined by $\tau^l$, and (iii) regions which require tests as defined by $\tau^u$. Of particular interest is the partitioning into exactly three regions, as defined by the following vector $\mathcal{R}[1:3]$:

$$\mathcal{R}[1] \cdot l = l_i \quad \mathcal{R}[1] \cdot u = l_i^s - 1 \quad \mathcal{R}[1] \cdot \tau = \tau^l \qquad (39)$$

$$\mathcal{R}[2] \cdot l = l_i^s \quad \mathcal{R}[2] \cdot u = u_i^s \quad \mathcal{R}[2] \cdot \tau = \tau^{false}$$

$$\mathcal{R}[3] \cdot l = u_i^s + 1 \quad \mathcal{R}[3] \cdot u = u_i \quad \mathcal{R}[3] \cdot \tau = \tau^u$$

where $\tau^{false}$ is a test vector indicating that no tests are performed (on the $\rho$ references of the form $A_j[f_j(i)]$). Other legal partitioning vectors can be generated by subdividing each of the three regions defined in Equation (39). It is also legal to move the first iteration of $\mathcal{R}[2]$ to $\mathcal{R}[1]$ or the last iteration of $\mathcal{R}[2]$ to $\mathcal{R}[3]$. (The moving can be repeated as many times as desired.) Note also that it is perfectly legal to compute $\tau^l$ and $\tau^u$ in any manner that results in test vectors greater than those computed in Equations (37) and (38), respectively. Even $\tau^{false}$ can be redefined as to include as many tests as desired. However, using exactly the three regions as computed in Equation (39) and $\tau^l$ and $\tau^u$ computed in Equations (37) and (38) has the advantage that the partitioning is minimal for a general loop, and that the tests for each reference are minimal for the corresponding partitioning.

Figure 19:
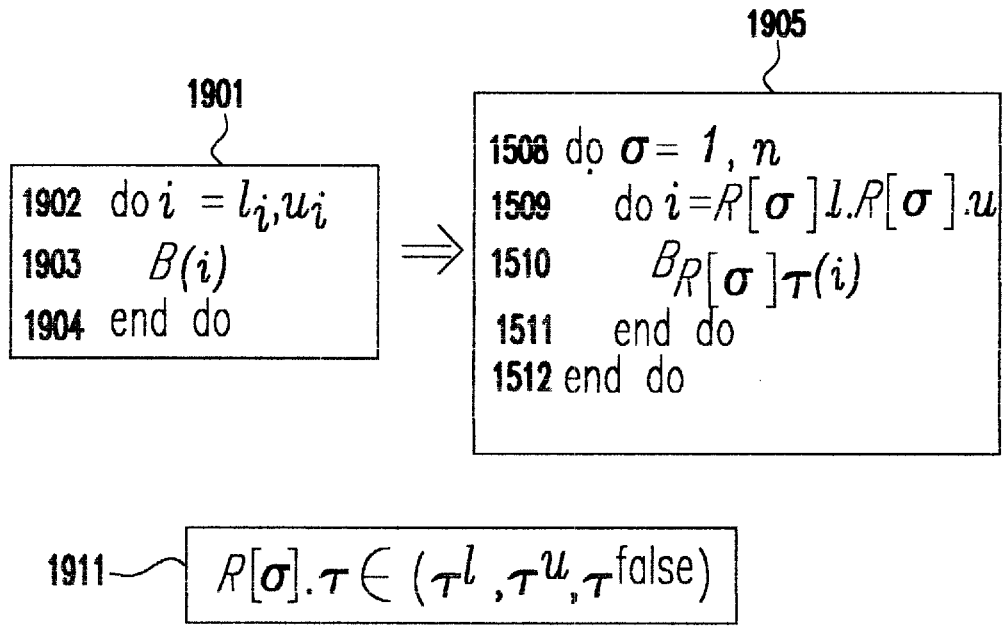
FIG. 19 illustrates the process of transformation of a loop structure in a computer program that generates regions with three different characteristics: (i) regions with no array reference violations, (ii) regions that precede regions with characteristic (i), and (iii) regions that succeed regions with characteristic (i)

An implementation of the method using the generic transformation of FIG. 13 is shown in FIG. 19. Note that only three versions of the loop body are necessary, since $\mathcal{R}[\delta]$. $\tau$ can only assume three values ($\tau^l$, $\tau^u$, and $\tau^{false}$) as shown in 1911. For compactness, we use the notation $B_l$, $B_u$, and $B_{false}$, to denote the three loop body versions $B_{\tau^l}$, $B_{\tau^u}$, and $B_{\tau^{false}}$, respectively. The explicit implementation of the transformed loop can follow either of the patterns shown in FIG. 14 and FIG. 15.

Figure 20:
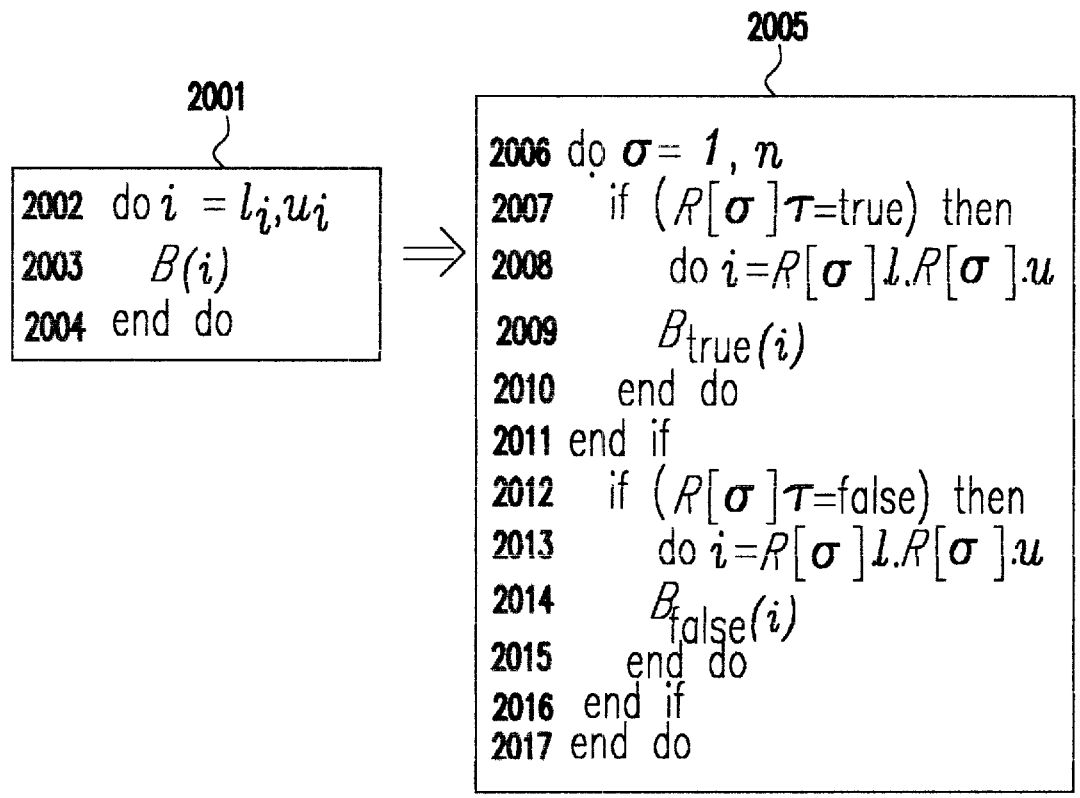
FIG. 20 illustrates a variant of the process in FIG. 19 that only generates two types of loop bodies.
Figure 21:
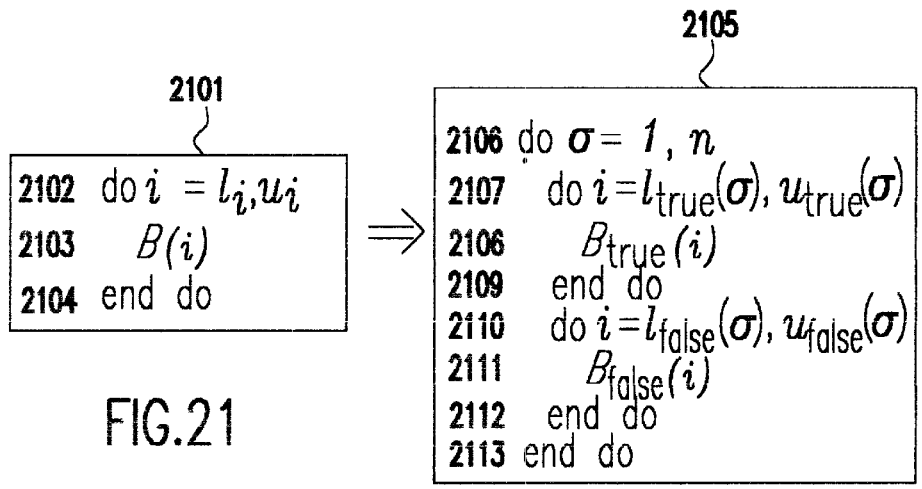
FIG. 21 illustrates another variant of the process in FIG. 19 that only generates two types of loop bodies.

We mentioned that $\tau^l$ and $\tau^u$ can be chosen to be any vector greater than as defined in Equations (37) and (38). In particular, we can make $\mathcal{R}[1].\tau = \mathcal{R}[3].\tau = \tau^{true}$, where $\tau^{true}$ is a test vector indicating that an all tests should be performed before each array reference. This leads to a variation of the method that only requires two versions of the loop body: $B_{\tau^{false}}$ and $B_{\tau^{true}}$, which for compactness, we represent by $B_{false}$ and $B_{true}$, respectively. The transformations representing this variant method are illustrated in FIGS. 20 and 21. FIG. 20 follows the pattern of FIG. 14, while FIG. 21 follows the pattern of FIG. 15. This variation of the method only uses two versions of code for the loop body.

Figure 22:
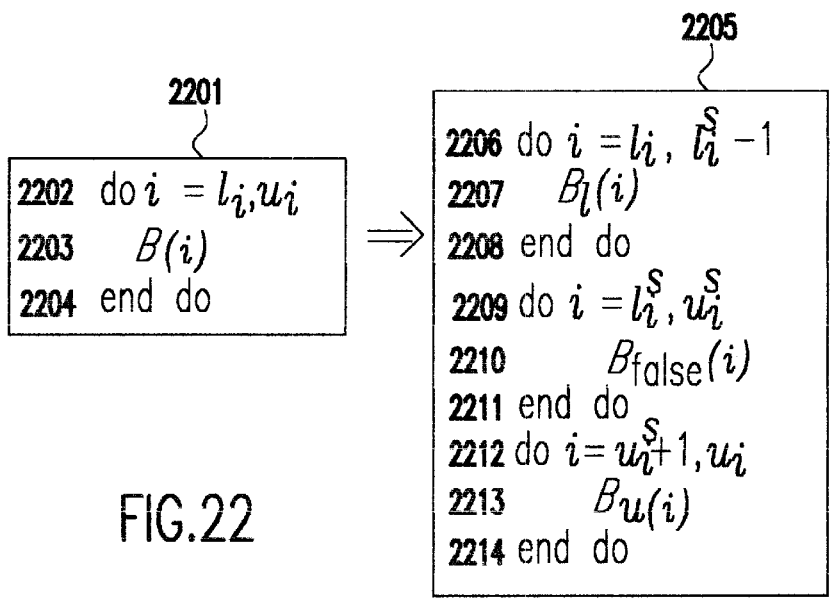
FIG. 22 illustrates the implementation of the process in FIG. 19 through the compile-time generation of multiple instances of the loop.
Figure 23:
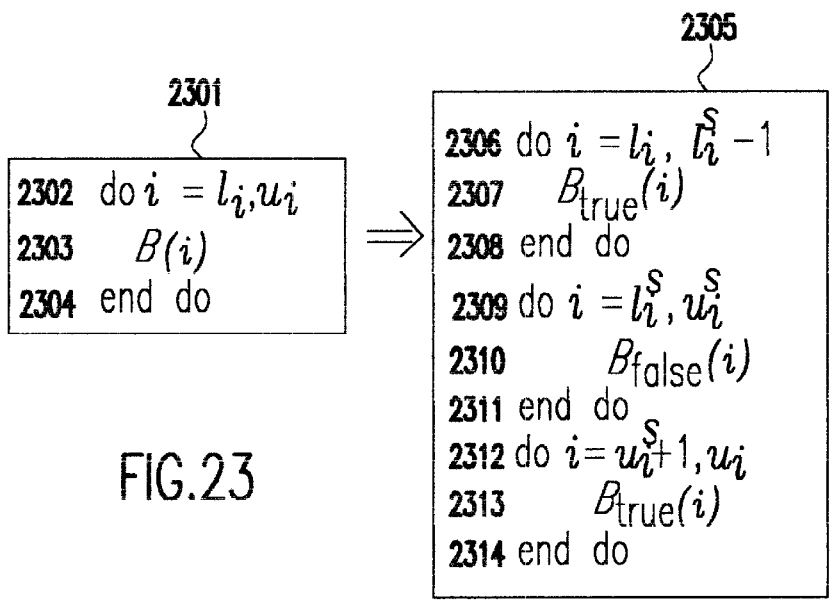
FIG. 23 illustrates the implementation of the processes in FIG. 20 and FIG. 21 through the compile-time generation of multiple instances of the loop.

Because our method and its variant always generate three regions with specific test vectors, they can be implemented by explicitly instantiating three loops with the appropriate loop bounds as defined by the $\mathcal{R}$ vector. The implementation of the method using three loop body versions ($B_l$, $B_u$, and $B_{false}$) is shown in FIG. 22 while the implementation using only two versions ($B_{true}$ and $B_{false}$) is shown in FIG. 23. In FIG. 22, loop 2206 implements region $\mathcal{R}[1]$ of 2201, loop 2209 implements region $\mathcal{R}[2]$ of 2201, and loop 2212 implements region $\mathcal{R}[3]$ of 2201. Correspondingly, in FIG. 23, loop 2306 implements region $\mathcal{R}[1]$ of 2301, loop 2309 implements region $\mathcal{R}[2]$ of 2301, and loop 2312 implements region $\mathcal{R}[3]$ of 2301.

Applying the Optimizations to Loop Nests

The methods described above can be applied to each and every loop in a program. In particular, they can be applied recursively to all loops in a loop nest. The order of application does not affect the final result. In our discussion we will sometimes show the application of the methods from outermost loop to innermost loop order. At other times, we will show the application of the methods from innermost to outermost loop order.

Figure 24:
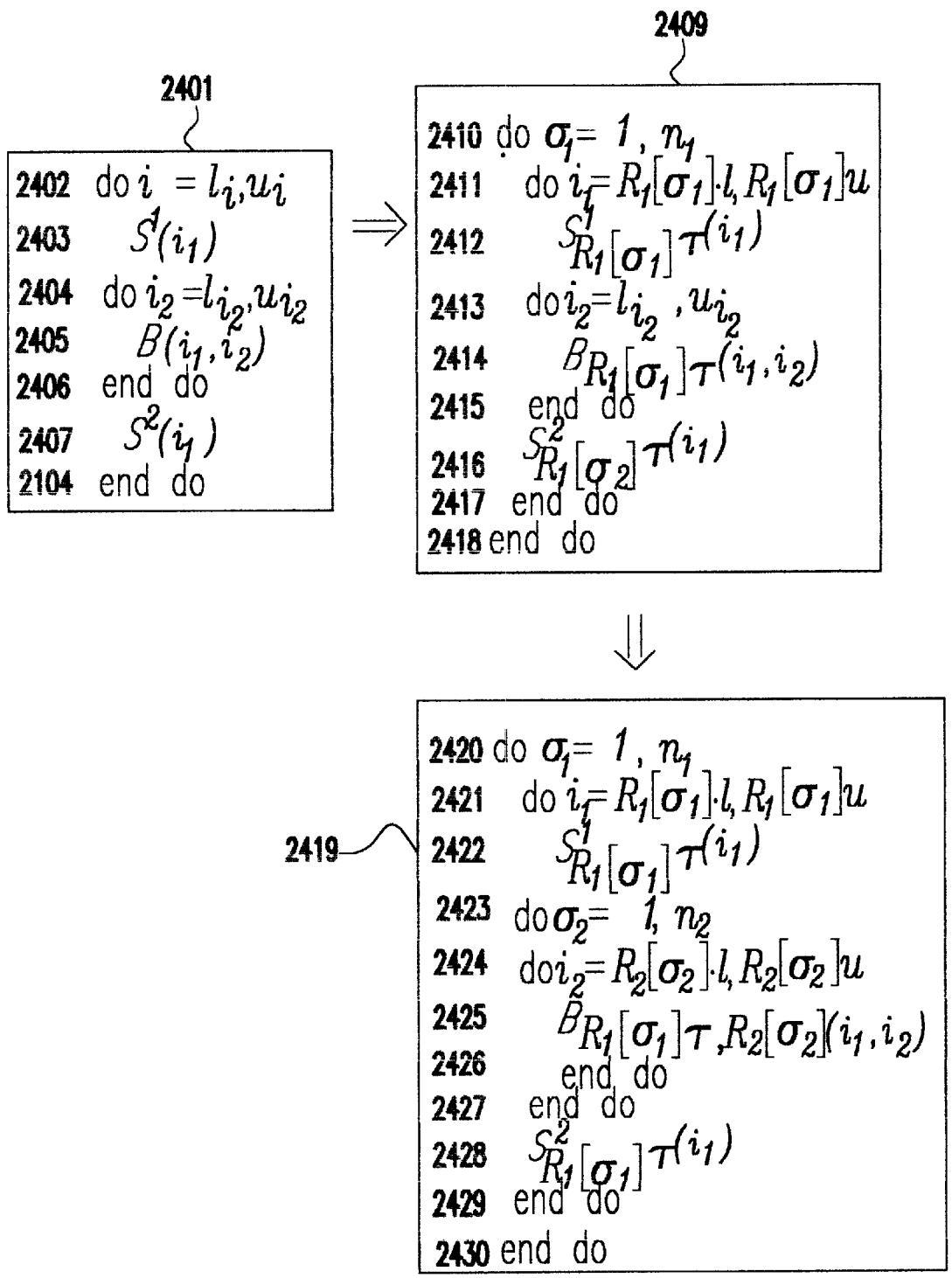
FIG. 24 illustrates the process of applying the transformation in FIG. 19 to a loop nest.

In FIG. 24, a doubly nested original loop is shown in 2401. The body of the outer $i_1$ loop (2402) consists of a (possibly empty) section of straight-line code $S^1(i_1)$ (2403), followed by an inner $i_2$ loop (2404), followed by a (possibly empty) section of straight-line code $S^2(i_1)$ (2407). The body of the inner loop $B(i_1,i_2)$ (2405) will, in general, contain references to both loop index variables, $i_1$ and $i_2$.

We first apply the transformation to the outer $i_1$ loop, resulting in the structure shown in 2409. $\mathcal{R}_1$ is the partitioning vector for the $i_1$ loop. The three test vectors for regions $\mathcal{R}_1[1]$, $\mathcal{R}_1[2]$, and $\mathcal{R}_1[3]$ are $\tau_1^l$, $\tau_1^{false}$, and $\tau_1^u$, respectively. $S_{R_1[\delta_1].\tau}(i_1)^1$, $S_{R_1[\delta_1].\tau}(i_1)^2$, and $B_{R_1[\delta_1].\tau}(i_1,i_2)$ represent $S^1(i_1)$, $S^2(i_1)$, and $B(i_1,i_2)$, respectively, with the array reference tests indicated by $\mathcal{R}_1[\delta_1].\tau$.

We then apply the method for optimizing array reference tests within an arbitrary loop structure to the inner loop $i_2$, resulting in the structure shown in 2419. $\mathcal{R}_2$ is the partitioning vector for the $i_2$ loop. The three test vectors for regions $\mathcal{R}_2[1]$, $\mathcal{R}_2[2]$, and $\mathcal{R}_2[3]$ are $\tau_2^l$, $\tau_2^{false}$, and $\tau_2^u$, respectively. $B_{R_1[\delta_1].\tau.R_2[\delta_2].\tau}(i_1,i_2)$ represents $B(i_1,i_2)$ with the array reference tests indicated by $\mathcal{R}_1[\delta_1].\tau$ and $\mathcal{R}_2[\delta_2].\tau$. The actual implementation of 2419 can follow either of the patterns shown in FIG. 14 or FIG. 15.

Note that this recursive application of the method for optimizing array reference tests within an arbitrary loop structure generates three versions of $S^1(i_1)$ and $S^2(i_1)$ (one for each value of $\mathcal{R}_1[\delta_1].\tau \in (\tau_1^l, \tau_1^u, \tau_1^{false})$) and nine versions of $B(i_1,i_2)$ (one for each combination of $\mathcal{R}_1[\delta_1].\tau \in (\tau_1^l, \tau_1^u, \tau_1^{false})$ and $\mathcal{R}_2[\delta_2].\tau \in (\tau_2^l, \tau_2^u, \tau_2^{false})$). In general, for a d-dimensional loop nest, $3^d$ versions of the innermost loop body $B(i_1, i_2, \ldots, i_d)$ are generated by the recursive application of the method for optimnizing array reference tests within an arbitrary loop structure.

FIG. 25 shows the first step in the application of a variation of the method for optimizing array reference tests within an arbitrary loop structure which only uses two versions of code for the loop being optimized. In FIG. 25, this variation is applied to a doubly nested loop 2501. This doubly nested loop has the same structure as 2401. In this particular case we are using the implementation of the method shown in FIG. 20.

In this first step, the transformation is applied to the outer $i_1$ loop 2502, resulting on the structure shown in 2509. $\mathcal{R}_1$ is the partitioning vector for the $i_1$ loop. The three test vectors for regions $\mathcal{R}_1[1]$, $\mathcal{R}_1[2]$, and $\mathcal{R}_1[3]$ are $\tau_1^{true}$, $\tau_1^{false}$, and $\tau_1^{true}$, respectively. $S_{true_1}^{1}(i_1)$, $S_{true_1}^{2}(i_1)$ and $B_{true_1}(i_1,i_2)$ represent $S^1(i_1)$, $S^2(i_1)$, and $B(i_1,i_2)$, respectively, with the array reference tests indicated by $\tau_1^{true}$. Correspondingly, $S_{false_1}^{1}(i_1)$, $S_{false_1}^{2}(i_1)$, and $B_{false_1}(i_1,i_2)$ represent $S^1(i_1)$, $S^2(i_1)$, and $B(i_1,i_2)$, respectively, with the array reference tests indicated by $\tau_1^{false}$.

The second step in the application of this variation of the method to the doubly nested loop is shown in FIG. 26. The result 2509 of the first step is shown again in 2601 for convenience. The resulting structure, after the second step of transformations, is shown in 2622. The inner $i_2$ loop 2606 is transformed into loop 2627, while the inner $i_2$ loop 2615 is transformed into loop 2645. For each iteration of the $i_1$ loop, $\mathcal{R}_2$ is the partitioning vector for the $i_2$ loop. The three test vectors for regions $\mathcal{R}_2[1]$, $\mathcal{R}_2[2]$, and $\mathcal{R}_2[3]$ are $\tau_2^{true}$, $\tau_2^{false}$, and $\tau_2^{true}$, respectively.

Note that there are four versions of $B(i_1,i_2)$, one for each combination of $\mathcal{R}_1[\delta_1].\tau \in (\tau_1^{true}, \tau_1^{false})$ and $\mathcal{R}_2[\delta_2].\tau \in (\tau_2^{true}, \tau_2^{false})$. In general, for a d-dimensional loop nest, $2^d$ versions of the innermost loop body $B(i_1,i_2,\ldots,i_d)$ are generated by recursive application of this variation of the method for optimizing array reference tests within an arbitrary loop structure.

This same method can be applied recursively using the implementation shown in FIG. 21. The first step of this particular case is shown in FIG. 27. The method is applied to a doubly nested loop 2701, which has the same structure as 2401. In the first step, the outer $i_1$ loop 2702 is transformed into loop 2710, which iterates over the three regions of the iteration space of 2702. Iterations of 2711 are only executed for $\mathcal{R}_1[\delta_1].\tau$=true. Iterations of 2718 are only executed for $\mathcal{R}_1[\delta_1].\tau$=false. This is achieved by setting the loop bounds appropriately:

$$l_{true_1}(\delta_1) = \begin{cases} \mathcal{R}_1[\delta_1] \cdot l & \text{if } \mathcal{R}_1[\delta_1] \cdot \tau = \text{true} \\ 0 & \text{if } \mathcal{R}_1[\delta_1] \cdot \tau = \text{false} \end{cases} \quad (40)$$

$$l_{false_1}(\delta_1) = \begin{cases} \mathcal{R}_1[\delta_1] \cdot l & \text{if } \mathcal{R}_1[\delta_1] \cdot \tau = \text{false} \\ 0 & \text{if } \mathcal{R}_1[\delta_1] \cdot \tau = \text{true} \end{cases} \quad (41)$$

$$u_{true_1}(\delta_1) = \begin{cases} \mathcal{R}_1[\delta_1] \cdot u & \text{if } \mathcal{R}_1[\delta_1] \cdot \tau = \text{true} \\ -1 & \text{if } \mathcal{R}_1[\delta_1] \cdot \tau = \text{false} \end{cases} \quad (42)$$

$$u_{false_1}(\delta_1) = \begin{cases} \mathcal{R}_1[\delta_1] \cdot u & \text{if } \mathcal{R}_1[\delta_1] \cdot \tau = \text{false} \\ -1 & \text{if } \mathcal{R}_1[\delta_1] \cdot \tau = \text{true} \end{cases} \quad (43)$$

$S_{true_1}^1(i_1)$, $S_{true_1}^2(i_1)$, $B_{true_1}(i_1,i_2)$, $S_{false_1}^1(i_1)$, $S_{false_1}^2(i_1)$, and $B_{false_1}(i_1,i_2)$ in FIG. 27 are exaclty the same as in FIG. 25.

The result 2709 from the first step of the transformation is replicated in 2801 of FIG. 28 for convenience. FIG. 28 shows the second step of the transformation. The inner $i_2$ loop 2805 is transformed into loop 2822, while the inner $i_2$ loop 2812 is transformed into loop 2834. Each of these loops implements one instance of the partitioning vector $\mathcal{R}_2$. Once again, the bounds for the $i_2$ loops have to be set appropriately:

$$l_{true_2}(\delta_2) = \begin{cases} \mathcal{R}_2[\delta_2] \cdot l & \text{if } \mathcal{R}_2[\delta_2] \cdot \tau = \text{true} \\ 0 & \text{if } \mathcal{R}_2[\delta_2] \cdot \tau = \text{false} \end{cases} \quad (44)$$

$$l_{false_2}(\delta_2) = \begin{cases} \mathcal{R}_2[\delta_2] \cdot l & \text{if } \mathcal{R}_2[\delta_2] \cdot \tau = \text{false} \\ 0 & \text{if } \mathcal{R}_2[\delta_2] \cdot \tau = \text{true} \end{cases} \quad (45)$$

$$u_{true_2}(\delta_2) = \begin{cases} \mathcal{R}_2[\delta_2] \cdot u & \text{if } \mathcal{R}_2[\delta_2] \cdot \tau = \text{true} \\ -1 & \text{if } \mathcal{R}_2[\delta_2] \cdot \tau = \text{false} \end{cases} \quad (46)$$

-continued $$u_{false_2}(\delta_2) = \begin{cases} \mathcal{R}_2[\delta_2] \cdot u & \text{if } \mathcal{R}_2[\delta_2] \cdot \tau = \text{false} \\ -1 & \text{if } \mathcal{R}_2[\delta_2] \cdot \tau = \text{true} \end{cases} \quad (47)$$

Figure 29:
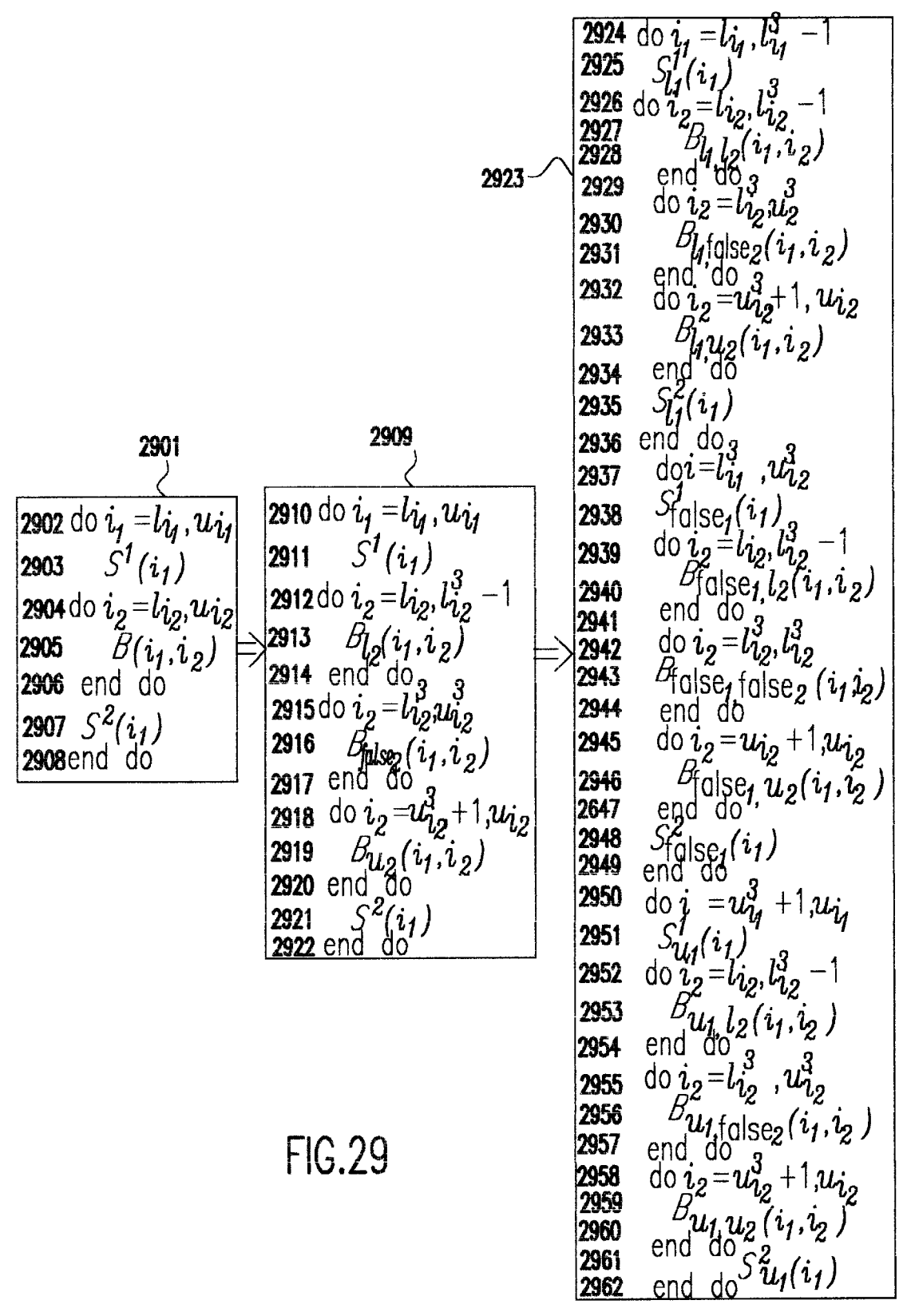

The method for optimizing array reference tests within an arbitrary loop structure and its variations through explicit instantiation of the regions of the loop iteration space can also be applied recursively. Application of the method of FIG. 22 to a doubly nested loop is shown in FIG. 29. The usual original loop is shown in 2901. We can apply the method to the inner $i_2$ loop 2904 first, which results in the three loops 2912, 2915, and 2918 shown in 2909. Each of these loops implements one region of the iteration space of the original $i_2$ loop 2904. The method is then applied to the outer $i_1$ loop 2910, resulting in the three loops 2924, 2937, and 2950. Each of these loops implements one region of the iteration space of the original $i_1$ loop 2902. Note that, as previously discussed, there are nine versions of loop body $B(i_1,i_2)$, which appear explicitly in 2923.

Application of the method of FIG. 23 to a doubly nested loop is shown in FIG. 30. The usual original loop is shown in 3001. We can apply the method to the inner $i_2$ loop 3004 first, which results in the three loops 3012, 3015, and 3018 shown in 3009. Each of these loops implements one region of the iteration space of the original $i_2$ loop 3004. The method is then applied to the outer $i_1$ loop 3010, resulting in the three loops 3024, 3037, and 3050. Each of these loops implements one region of the iteration space of the original $i_1$ loop 3002. Note that, as previously discussed, there are nine versions of loop body $B(i_1,i_2)$, which appear explicitly in 3023.

Selective Application of the Methods to Loop Nests

Instead of applying the foregoing methods recursively to all loops in a loop nest, different strategies can be applied. The application of any of these methods to a loop results in a partitioning of the iteration space of the loop into two or three types of regions (depending on the method). One of the types, characterized by the $\tau^{false}$ test vector, does not need any array reference tests on references indexed by the loop control variable. Since the other types, characterized by the $\tau^l$, $\tau^u$, or $\tau^{true}$ test vectors, contain tests on at least some array references, the benefits of applying the transformation recursively are diminished. On the other hand, by continuing to apply the transformation to the $\tau^{false}$ regions we can potentially arrive at regions that are free of all array reference tests. For many programs, these regions with no tests are expected to contain most or all of the iterations of the loop nest.

Therefore, we propose variants to the foregoing methods in which the transformation is recursively applied always from outer loop to inner loop order. The recursion is applied only to those regions without tests on the loop index variable.

Figure 31:
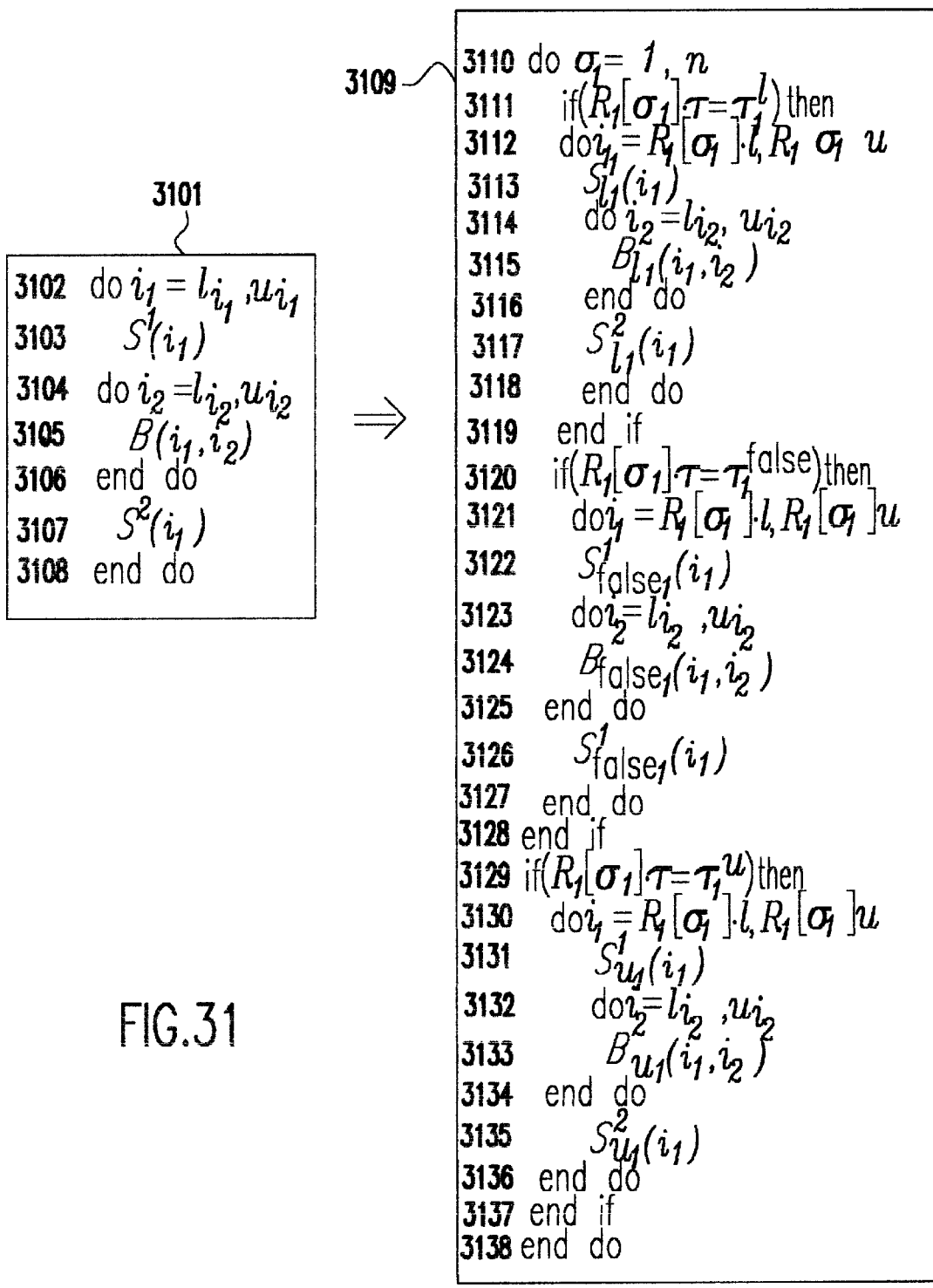
FIG. 31 illustrates the first step of the selective application of the method of FIG. 19 to a loop nest, the method being applied according to the implementation in FIG. 14.

Consider first the method for optimizing array reference tests within an arbitrary loop structure as described above. In FIG. 31 we show the transformation applied to the outer $i_1$ loop 3102 of a doubly nested loop 3101. The resulting structure is shown in 3109, using the implementation of FIG. 14. We show the implementation explicitly in this case because the next step of the transformation will be applied only to loop 3123, which belongs to the region with no tests. 3109 is replicated in 3201 of FIG. 32 for convenience. This figure shows the recursive application of the method to the $i_2$ loop 3215. This loop is transformed into loop 3245, which contains three instances of the $i_2$ loop in 3247, 3252, and 3257. Each instance implements one of the three types of regions. The overall structure resulting from the selective recursive application of the method is shown in 3231.

Note that only five versions of the loop body $B(i_1,i_2)$ are generated: $B_{l_1,true_2}(i_1i_2)$ (which is the same as $B_{l_1}(i_1,i_2)$), $B_{false_1,l_2}(i_1,i_2)$, $B_{false_1,false_2}(i_1,i_2)$, $B_{false_1,u_2}(i_1,i_2)$ and $B_{u_1,true_2}(i_1,i_2)$ (which is the same as $B_{u_1}(i_1,i_2)$). In general, for a d-dimensional loop nest, 2d+1 versions of the innermost loop body $B(i_1,i_2,\ldots,i_d)$ are generated by the selective recursive application of the method. (If tests are not specified for a loop with control variable $i_j$, then all references indexed by $i_j$ must be fully tested.)

Figure 33:
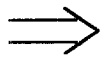
FIG. 33 illustrates the first step of the selective application of the method of FIG. 19 to a loop nest, the method being applied according to the implementation in FIG. 15.
Figure 34:
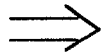
FIG. 34 illustrates the second step of the selective application of the method of FIG. 19 to a loop nest, the method being applied according to the implementation in FIG. 15.

The exact same operation can be performed using the implementation of FIG. 15. The first step is shown in FIG. 33. The method is applied to the outer $i_1$ loop 3302 of the double loop nest 3301. This results in structure 3309, replicated in 3401 of FIG. 34 for convenience. The method is applied again to the inner $i_2$ loop 3412, resulting in the final structure 3425.

Selective recursion can also be applied to the variation of the method which only uses two versions of code for the loop being optimized. FIG. 35 shows the method applied to the outer $i_1$ loop 3502 of a doubly nested loop 3501, using the implementation of FIG. 20. FIG. 35 is identical to FIG. 25. Using selective recursion, the method is applied next only to loop 3523. Structure 3509 is replicated in 3601 of FIG. 36 for convenience. Loop 3615 is transformed into loop 3636, which contains two instances, 3638 and 3643, of the inner $i_2$ loop.

Note that three versions of the loop body $B(i_1,i_2)$ are generated: $B_{true_1,true_2}(i_1,i_2)$ (which is the same as $B_{true_1}(i_1,i_2)$), $B_{false_1,true_2}(i_1,i_2)$, and $B_{false_1,false_2}(i_1,i_2)$. In general, for a d-dimensional loop nest, d+1 versions of the innermost loop body $B(i_1,i_2,\ldots,i_d)$ are generated by the selective recursive application of the method.

Figure 37:
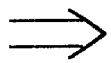
FIG. 37 illustrates the first phase of the process of selectively applying the transformation in FIG. 21 to a loop nest, the transformation being applied to the outer loop 3702 of 3701 to generate 3709.

FIGS. 37 and 38 show the selective recursive application of the method using the implementation of FIG. 21. FIG. 37 is identical to FIG. 27. In it, the method is applied to the outer $i_1$ loop 3702 of a doubly nested loop 3701. This results in structure 3709. Structure 3709 is replicated in 3801 of FIG. 38. The method is then applied to the $i_2$ loop 3812. Loop 3812 is transformed into loop 3829. Note the same three versions of the loop body $B(i_1,i_2)$ in 3818 as in 3622.

Finally, selective recursion can also be used with the method for optimizing array reference tests within an arbitrary loop structure and its variations through explicit instantiation of the regions of the loop iteration space. Selective recursive application of the method of FIG. 22 to a doubly nested loop 3901 is shown in FIG. 39. The method is first applied to the outer $i_1$ loop 3902, which results in the three loops 3910, 3917 and 3924 in 3909. Loop 3917 implements the region with no array reference tests on the index variable $i_1$, as indicated by the $S_{false_1}^{1}(i_1)$, $B_{false_1}(i_1,i_2)$, $S_{false_1}^{2}(i_1)$ versions of code. The method is then applied recursively only to $i_2$ loop 3919, which results in the three loops 3941, 3944, and 3947 in 3931. Note the same five versions of the loop body $B(i_1,i_2)$ as in FIGS. 32 and 34.

Selective recursive application of the method of FIG. 23 to a doubly nested loop 4001 is shown in FIG. 40. The method is first applied to the outer $i_1$ loop 4002 which results in the three loops 4010, 4017, and 4024 in 4009. Loop 4017 implements the region with no array reference tests on the index variable $i_1$, as indicated by the $S_{false_1}^{1}(i_1)$, $B_{false_1}(i_1,i_2)$, $S_{false_1}^{2}(i_1)$ versions of code. The method is then applied recursively only to $i_2$ loop 4019 which results in the three loops 4041, 4044, and 4047 in 4031. Note the same three versions of the loop body $B(i_1,i_2)$ as in FIGS. 36 and 38.

Methods for Perfect Loop Nests

Consider a d-dimensional perfect loop nest as follows:

$$\begin{array}{l} \text{do } i_1 = l_{i_1}, u_{i_1} \\ \quad \text{do } i_2 = l_{i_2}, u_{i_2} \\ \quad \quad \ldots \\ \quad \quad \text{do } i_d = l_{i_d}, u_{i_d} \\ \quad \quad \quad B(i_1,i_2,\ldots,i_d) \\ \quad \quad \text{end do} \\ \quad \ldots \\ \quad \text{end do} \\ \text{end do} \end{array}$$

This loop nest defines a d-dimensional iteration space where $i_1, i_2, \ldots, i_d$ are the axes of the iteration space. Each iteration, except for the last, has an immediately succeeding iteration in execution order. Conversely, each iteration, except the first, has an immediately preceding iteration in execution order. This d-dimensional iteration space can be partitioned into a sequence of regions defined by a vector $\mathcal{R}[1\text{:}n]$, where $\mathcal{R}[\delta] = ((\mathcal{R}[\delta].l_1, \mathcal{R}[\delta].l_2, \ldots, \mathcal{R}[\delta].l_d), \mathcal{R}[\delta].u_1,$
$\quad \mathcal{R}[\delta].u_2, \ldots, \mathcal{R}[\delta].u_d), \mathcal{R}[\delta].\tau),$ $\mathcal{R}[\delta].l_j$ = lower bound of loop $i_j$ in region $\mathcal{R}[\delta]$, $\mathcal{R}[\delta].u_j$ = upper bound of loop $i_j$ in region $\mathcal{R}[\delta]$, $\mathcal{R}[\delta].\tau$ = test vector for region $\mathcal{R}[\delta]$.

A partitioning can have any number of empty regions, since an empty region does not execute any iterations of the iteration space. Given a generic partitioning vector $\mathcal{R}[1\text{:}m]$ with (m−n) empty regions, we can form an equivalent partitioning vector $\mathcal{R}[1\text{:}n]$ with only nonempty regions by removing the empty regions from $\mathcal{R}[1\text{:}m]$. From now on, we consider only partitionings where every region $\mathcal{R}[\delta]$ is nonempty.

For a partitioning vector to be valid, the following conditions must hold:

1. The first iteration of region $\mathcal{R}[\delta+1]$ must be the iteration immediately succeeding the last iteration of region $\mathcal{R}[\delta]$ in execution order, for $\delta=1, \ldots, n-1$.

2. The first iteration of $\mathcal{R}[\delta]$ must be the first iteration, in execution order, of the iteration space.

3. The last iteration of $\mathcal{R}[n]$ must be the last iteration, in execution order, of the iteration space.

4. The test for array reference $A_j[\sigma_j]$ in region $\mathcal{R}[\delta]$, as defined by the test vector element $\mathcal{R}[\delta].\tau_j$, has to be greater than or equal to the minimum test for each outcome of reference $A_j[\sigma_j]$ in region $\mathcal{R}[\delta]$. We can express this requirement as:

$\mathcal{R}[\delta].\tau \geq_{pullout;zu735800.900[\delta]} \max(\tau_{min}(\chi_j[i_1,i_2,\ldots,i_d])).jk$ (48)

where the max is computed over all iterations of region $\mathcal{R}[\delta]$ and $\chi_j[i_1,i_2,\ldots,i_d]$ is the (possibly estimated) outcome of reference $A_j[\sigma_j]$ in iteration point $(i_1,i_2,\ldots,i_d)$.

Figure 41:
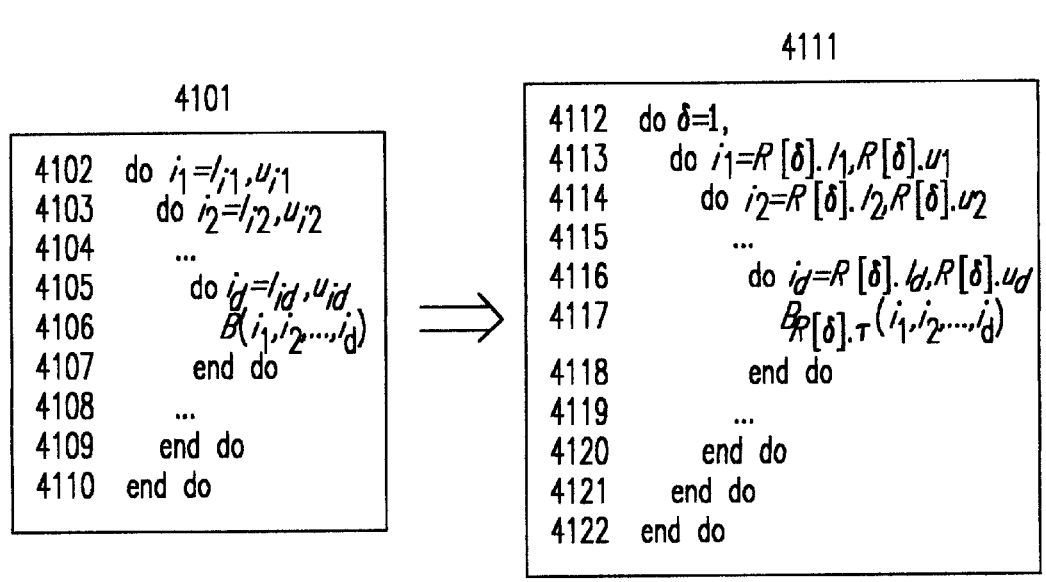
FIG. 41 illustrates the process of optimizing array reference tests for a perfect loop nest, wherein the driver loop 4112 dynamically instantiates multiple regions of the original loop nest 4101.

Using any valid partitioning, a d-dimensional perfect loop nest can be implemented by a driver loop that iterates over the regions. This is shown in FIG. 41. 4101 is the original perfect loop nest, while 4111 is an implementation of this loop nest with a driver loop 4112 iterating over the regions.

Figure 42:
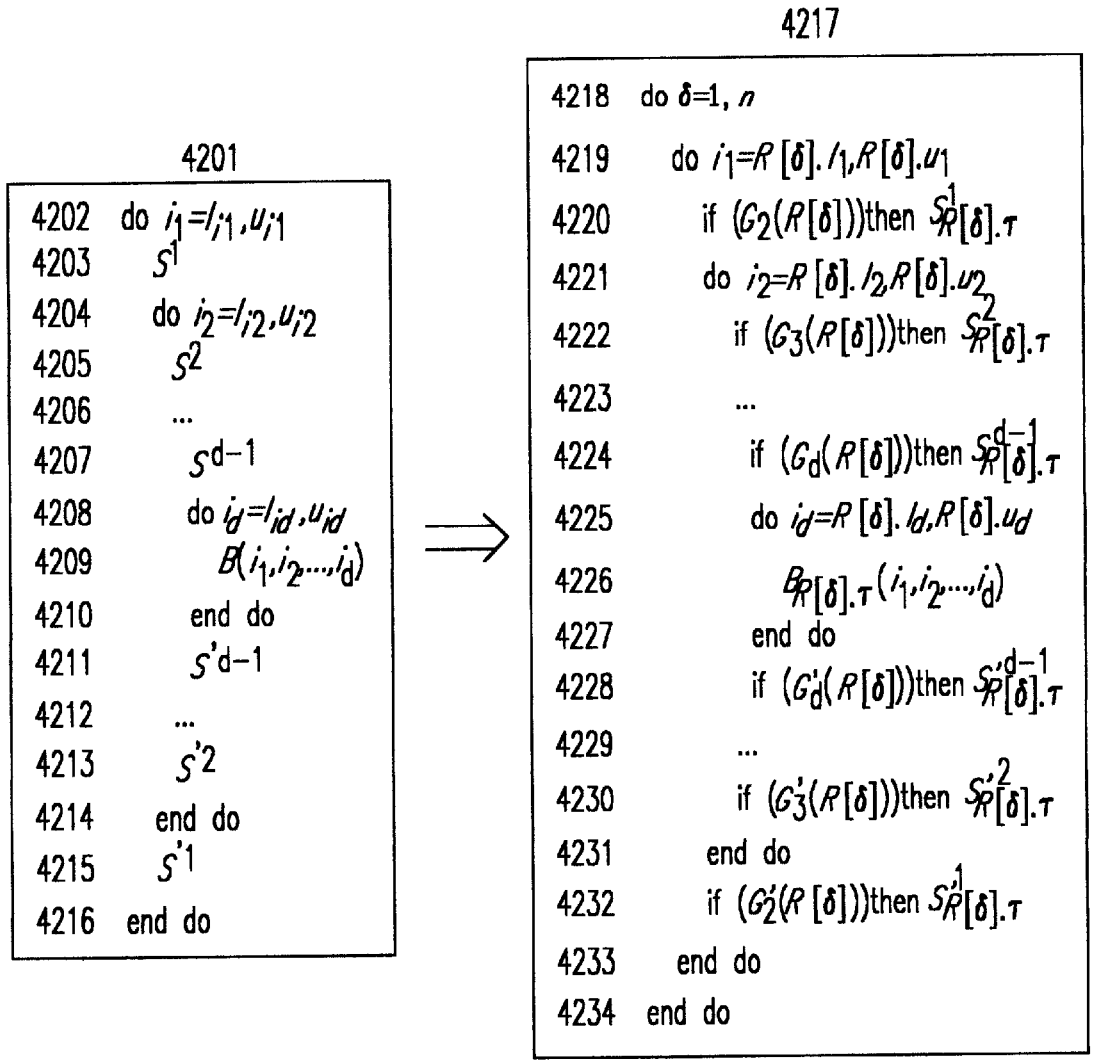
FIG. 42 illustrates the same process of FIG. 41 when applied to a loop nest 4201 with the following structure, the body of each loop in the loop nest comprising: (i) a possibly empty section of straight-line code, (ii) a possibly empty loop, and (iii) a possibly empty section of straight-line code.

The partitioning also works when the body of each loop $i_j$ in a d-dimensional loop nest consists of three sections, each possibly empty: (i) a section of straight line code $S^j$, followed by (ii) a loop $i_{j+1}$, followed by (iii) another section of straight line code $S^{ij}$. This structure is shown in 4201 of FIG. 42. The implementation with a driver loop 4218 iterating over the regions is shown in 4217. The execution of each section of straight line code $S^j$ and $S^{ij}$ is guarded with an if-statement to guarantee that they are executed only at the right times. As a result of the partitioning of the iteration space, the same value for the set $(i_1, i_2, \ldots, i_j)$ can occur on consecutive iterations of the driver loop. For correct execution, $S^j$ should only execute for the first occurrence of a particular value of $(i_1, i^2, \ldots, i_j)$. This first occurrence corresponds to the execution of a region with $\mathcal{R}[\delta].l_{j+1}=l_{i_{j+1}}$, $\mathcal{R}[\delta].l_{j+2}=l_{i_{j+2}}, \ldots \mathcal{R}[\delta].l_d=l_{i_d}$. Correspondingly, $S'_j$ should only execute for the last occurrence of a particular value of $(i_1, i_2, \ldots, i_j)$. This last occurrence corresponds to the execution of a region with $\mathcal{R}[\delta].u_{j+1}=u_{i_{j+1}}$, $\mathcal{R}[\delta].u_{j+2}=u_{i_{j+2}}, \ldots, \mathcal{R}[\delta].u_d=u_{i_d}$. Thus, we arrive at the expressions for the guards used in 4217:

$$G_j(\mathcal{R}[\delta]) = \bigwedge_{k=j}^{d} (\mathcal{R}[\delta] \cdot l_k = l_{i_k}) \tag{49}$$

$$G'_j(\mathcal{R}[\delta]) = \bigwedge_{k=j}^{d} (\mathcal{R}[\delta] \cdot u_k = u_{i_k}) \tag{50}$$

Finally, the test vector $\mathcal{R}[\delta].\tau$ must be applied to the section of straight line code for each region $\mathcal{R}[\delta]$. We denote by $S^j\mathcal{R}[\delta].\tau$ a version of $S^j$ that performs test $\mathcal{R}[\delta].\tau_j$ before reference $A_j[\sigma_j]$, if this reference occurs in $S^j$. The same is valid for $S^{ij}\mathcal{R}[\delta].\tau$ with respect to $S^{ij}$.

We are particularly interested in computing a partitioning where the regions can be of two kinds:
1. All array references $A_j[\sigma_j]$ in the region execute successfully.
2. Some array reference $A_j[\sigma_j]$ in the region causes a violation. For a region $\mathcal{R}[\delta]$ of kind (1), we can define $\mathcal{R}[\delta].\tau$=false as a test vector that does not test any reference $A_j[\sigma_j]$. For a region $\mathcal{R}[\delta]$ of kind (2), we can define $\mathcal{R}[\delta].\tau$=true as a test vector that performs all tests on every array reference $A_j[\sigma_j]$. In this case, we only need two versions of $B(i_1, i_2, \ldots, id)$: (i) $B_{true}(i_1, i_2, \ldots, i_d)$ performs all tests for all array references, and (ii) $B_{false}(i_1, i_2, \ldots, i_d)$ does not perform any tests.

If all references are of the form that allow the safe bounds $l_{i_j}^s$ and $u_{i_j}^s$ to be computed for every loop $i_j$, then the aforementioned partitioning can be computed by the following algorithm:

---
Procedure for computing the regions of a loop nest.
---
procedure regions(R,j,($\alpha_1, \alpha_2, \ldots, \alpha_{j-1}$), ($\omega_1, \omega_2, \ldots, \omega_{j-1}$), δ, d, B
S1  if($l_j < l_j^s$) then
S2    δ = δ + 1
S3    R[δ] = (($\alpha_1, \ldots, \alpha_{j-1}, l_j l_{j+1}, \ldots, l_d$), ($\omega_1, \ldots, \omega_{j-1}, l_j^s-1, u_{j+1}, \ldots, u_d$), true)
S4  endif
S5  if (j = d) then
S6    if ($l_d^s \leq u_d^s$) then
S7      δ = δ + 1
S8      R[δ] = (($\alpha_1, \ldots, \alpha_{d-1}, l_d^s$), ($\omega_1, \ldots, \omega_{d-1}, u_d^s$), false)
S9    endif ---
-continued
Procedure for computing the regions of a loop nest.
---
S10 else
S11   do k = $l_j^s, u_j^s$
S12     regions(R,j+1,($\alpha_1, \alpha_2, \ldots, \alpha_{j-1}, k$), ($\omega_1, \omega_2, \ldots, \omega_{j-1}, k$), δ, d, B
S13   end do
S14 end if
S15 if ($u_j > u_j^s$) then
S16   δ = δ + 1
S17   R[δ] = (($\alpha_1, \alpha_{j-1}, u_j^s+1, l_{j+1}, \ldots, l_d$), ($\omega_1, \ldots, \omega_{j-1}, u_j, u_{j+1}, \ldots, u_d$), true)
S18 end if
end procedure The algorithm in procedure regions ( ) takes seven parameters:

1. The vector $\mathcal{R}$ that is being computed.
2. The index j indicating that region extends along index variable $i_j$ are being computed.
3. The vector $(\alpha_1, \alpha_2, \ldots, \alpha_{j-1})$ where $\alpha_k$ is the lower bound for loop index $i_k$ in the regions to be computed.
4. The vector $(\omega_1, \omega_2, \ldots, \omega_{j-1})$, where $\omega_k$ is the upper bound for loop index $i_k$ in the regions to be computed.
5. The count δ of the number of regions already computed.
6. The dimensionality d of the loop nest.
7. The vector $\mathbf{B}[1:d]$, where $\mathbf{B}[j]=(l_j, u_j, l_j^s, u_j^s)$ contains the full and safe bounds for loop $i_j$.

To compute the entire vector of regions, the invocation regions ($\mathcal{R}$, 1, ( ), ( ), δ=0, d, $\mathbf{B}$) should be performed. The value of δ at the end of the computation is the total number of regions in $\mathcal{R}$.

An important optimization. If, for a particular value of j, $l_j^s=l_j$ and $u_j^s=u_j$, then the safe region along axis $i_j$ of the iteration space corresponds to the entire extent of the axis. If $l_k^s=l_k$ and $u_k^s=u_k$ for k=j+1, ..., d, then axis $i_j$ can be partitioned into only three regions: (i) one region from $l_j$ to $l_j^s-1$, (ii) one region from $l_j^s$ to $u_j^s$, and (iii) one region from $u_j^s+1$ to $u_j$. Each of these regions spans the entire iteration space along axes $i_{j+1}, i_{j+2}, \ldots, i_d$. Collapsing multiple regions into a single region reduces the total number of iterations in the driver loop 4218 and, consequently, reduces the run-time overhead of the method. To incorporate this optimization in the computation of regions, procedure regions is modified as follows:

---
Optimized procedure for computing the regions of a loop nest.
---
procedure regions(R,j,($\alpha_1, \alpha_2, \ldots, \alpha_{j-1}$), ($\omega_1, \omega_2, \ldots, \omega_{j-1}$), δ, d, B
  if($l_j < l_j^s$) then
    δ = δ + 1
    R[δ] = (($\alpha_1, \ldots, \alpha_{j-1}, l_{j+1}, \ldots, l_d$), ($\omega_1, \ldots, \omega_{j-1}, l_j^s-1, u_{j+1}, \ldots, u_d$), true)
  endif
  if (j = d) then
    if ($l_d^s \leq u_d^s$) then
      δ = δ + 1
      R[δ] = (($\alpha_1, \ldots, \alpha_{d-1}, l_d^s$), ($\omega_1, \ldots, \omega_{d-1}, u_d^s$) false)
    endif
  elseif (nochecks(($l_{j+1}, l_{j+2}, \ldots, l_d$), ($l_{j+1}^s, l_{j+2}^s, \ldots, l_d^s$), ($u_{j+1}, u_{j+2}, \ldots, u_d$),
           ($u_{j+1}^s, u_{j+2}^s, \ldots, u_d^s$)) then
    δ = δ + 1
    R[δ] = (($\alpha_1, \ldots, \alpha_{j-1}, l_j^s, l_{j+1}, \ldots, l_d$), ($\omega_1, \ldots, \omega_{j-1}, u_j^s, u_{j+1}, \ldots, u_d$), false)
  else
    do k + $l_j^s, u_j^s$ -continued Optimized procedure for computing the regions of a loop nest.

```
    regions(R,j+1,(α₁, α₂, ..., α_{j-1}, k), (ω₁, ω₂, ..., ω_{j-1}, k), δ, d, B)
    end do
  end if
  if (u_j > j_j^s) then
    δ = δ + 1
    R[δ] = ((α₁, ..., α_{j-1}, u_j^s+1, l_{j+1}, ..., l_d), (ω₁, ..., ω_{j-1}, u_j,
      u_{j+1}, ..., u_d), true)
  end if
end procedure
boolean function no checks((l₁, ..., l_m), (l₁^s, ..., l_m^s), (u₁, ..., u_m), u₁^s,
  ..., u_m^s))
  if (((l_i = l_i^s)(u_i = u_i^s))∀i=1, ..., m) then
    return true
  else
    return false
  end if
end function
```

Figure 44:
FIG. 44 illustrates the same process of FIG. 43 when applied to a loop nest 4401, the body of each loop in the loop nest comprising: (i) a possibly empty section of straight-line code, (ii) a possibly empty loop, and (iii) a possibly empty section of straight-line code, this implementation following the patten of FIG. 15.

We discuss two alternatives for the implementation of the method for optimizing array reference tests within a loop nest using static code generation. If the vector $\mathcal{R}$ is computed as previously described, only two versions of the loop body need to be generated, $B_{true}(i_1, i_2, \ldots, i_d)$ and $B_{false}(i_1, i_2, \ldots, i_d)$. Also, two versions of $S^j$, $S^j_{true}$ and $S^j_{false}$ and two versions of $S^{ij}$, $S^{ij}_{true}$ and $S^{ij}_{false}$, need to be generated. Using these two versions of the loop body and two versions of each section of straight line code, a d-dimensional loop nest can be transformed as shown in FIGS. 43 and 44. The loop nest without sections of straight line code 4301 is transformed into 4311. The loop nest with sections of straight line code 4401 is transformed into 4417. The transformed code in 4311 and 4417 has two instances of the original loop nest. The bounds for each loop in these loop nests can be computed by $$\left. \begin{array}{l} l_j^{true}(\delta) = \mathcal{R}[\delta] \cdot l_j \\ u_j^{true}(\delta) = \mathcal{R}[\delta] \cdot u_j \end{array} \right\} \text{ if } (\mathcal{R}[\delta] \cdot \tau = \text{true}) \quad (51)$$

$$\left. \begin{array}{l} l_j^{true}(\delta) = 0 \\ u_j^{true}(\delta) = -1 \end{array} \right\} \text{ if } \mathcal{R}[\delta] \cdot \tau = \text{false}) \text{ and} \quad (52)$$

$$\left. \begin{array}{l} l_j^{false}(\delta) = \mathcal{R}[\delta] \cdot l_j \\ u_j^{false}(\delta) = \mathcal{R}[\delta] \cdot u_j \end{array} \right\} \text{ if } \mathcal{R}[\delta] \cdot \tau = \text{false}) \quad (53)$$

$$\left. \begin{array}{l} l_j^{false}(\delta) = 0 \\ u_j^{false}(\delta) = -1 \end{array} \right\} \text{ if } \mathcal{R}[\delta] \cdot \tau = \text{true}). \quad (54)$$

The guard expressions used in the if-statements in 4417 can be expressed in terms of these bounds:

$$G_j(l) = \bigwedge_{k=j}^{d} (l_k = l_{i_k}) \quad (55)$$

$$G'_j(u) = \bigwedge_{k=j}^{d} (u_k = u_{i_k}) \quad (56)$$

Figure 45:
FIG. 45 illustrates an implementation of the same process of FIG. 44 which uses an if-statement 4519 to select between two different instances of the original loop 4501, the first instance being 4520 and the second instance being 4536, this implementation following the pattern of FIG. 14.
Figure 46:
FIG. 46 illustrates a process to optimize array reference checks in a loop nest 4601 by executing the whole iteration space as a single region, two instances of the original loop nest being created in 4617, the first instance being represented by loop 4520 and the second instance being represented by loop 4536.

Alternatively, the implementation shown in FIG. 45 can be used. It is semantically equivalent to the method shown in FIG. 44, but it does not require computing the new loop bounds $l_j^{true}(\delta)$, $u_j^{true}(\delta)$, $l_j^{false}(\delta)$, and $u_j^{false}(\delta)$ used in FIG. 44. Instead, an if-statement 4519 is used to verify which kind of region is region $\mathcal{R}[\delta]$. If the region requires a test on any array reference, then the loop nest 4520–4534 is executed. If the region does not require any tests on array references, then the loop nest 4536–4550 is executed.

Using a Single Region

In the extreme case, we can partition the entire iteration space of a d-dimensional loop nest into a single region $\mathcal{R}[1]$. This region is defined as:

$$\mathcal{R}[1].l_j = l_{i_j}, \text{for } j=1, \ldots, d, \quad (57)$$

$$\mathcal{R}[1].u_j = u_{i_j}, \text{for } j=1, \ldots, d, \quad (58)$$

$$\mathcal{R}[1] \cdot \tau_j = \quad (59)$$

$$\begin{cases} \text{all tests} & \text{if any } \chi_k[i_1, \ldots, i_d] \text{ is a violation, } k = 1, \ldots, \rho \\ \text{no test} & \text{otherwise.} \end{cases}$$

We use $\mathcal{R}[1].\tau$=true to denote that all tests must be performed, and $\mathcal{R}[1].\tau$=false to denote that no tests are to be performed.

Using only two versions of the loop body and each section of straight line code, we transform the loop nest 4601 into 4617. Note that, since there is only one region, there is no need for a driver loop in 4617. There are two instances of the loop nest in 4617, and the bounds are computed by $$\left. \begin{array}{l} l_j^{true} = \mathcal{R}[1] \cdot l_j \\ u_j^{true}(\delta) = \mathcal{R}[1] \cdot u_j \end{array} \right\} \text{ if } (\mathcal{R}[1] \cdot \tau = \text{true}) \quad (60)$$

$$\left. \begin{array}{l} l_j^{true} = 0 \\ u_j^{true} = -1 \end{array} \right\} \text{ if } \mathcal{R}[1] \cdot \tau = \text{false}) \text{ and} \quad (61)$$

$$\left. \begin{array}{l} l_j^{false} = \mathcal{R}[1] \cdot l_j \\ u_j^{false} = \mathcal{R}[1] \cdot u_j \end{array} \right\} \text{ if } \mathcal{R}[1] \cdot \tau = \text{false}) \quad (62)$$

$$\left. \begin{array}{l} l_j^{false} = 0 \\ u_j^{false} = -1 \end{array} \right\} \text{ if } \mathcal{R}[1] \cdot \tau = \text{true}). \quad (63)$$

FIG. 47 shows another transformation of the loop nest 4701 into 4717 that implements a partitioning with a single region. A single test 4718 is used in 4717 to verify the kind of region. The appropriate instance of the loop nest is selected based on the test. The value of the flag check is the same as $\mathcal{R}[1].\tau$. If the safe bounds $l_{i_j}^s$ and $u_{i_j}^s$ can be computed for every loop $i_j$, then check can be computed by $$\text{check} = \begin{cases} \text{false} & \text{if } (l_{i_j}^s = l_{i_j}) \text{ and } (u_{i_j}^s = u_{i_j}) \text{ for all } j=1, \ldots, d, \\ \text{true} & \text{otherwise.} \end{cases} \quad (64)$$

In general, check=true if the outcome of any array reference $A[\sigma]$ in the execution of the loop nest is a violation or is unknown, and check=false if all outcomes of array references in the execution of the loop nest are either successful or not executed.

Treating Sequences of Array References with Versions

This approach of dynamically selecting from two versions of a loop (one with all tests and another with no tests) can be extended to any sequence of array references.

Figure 48:
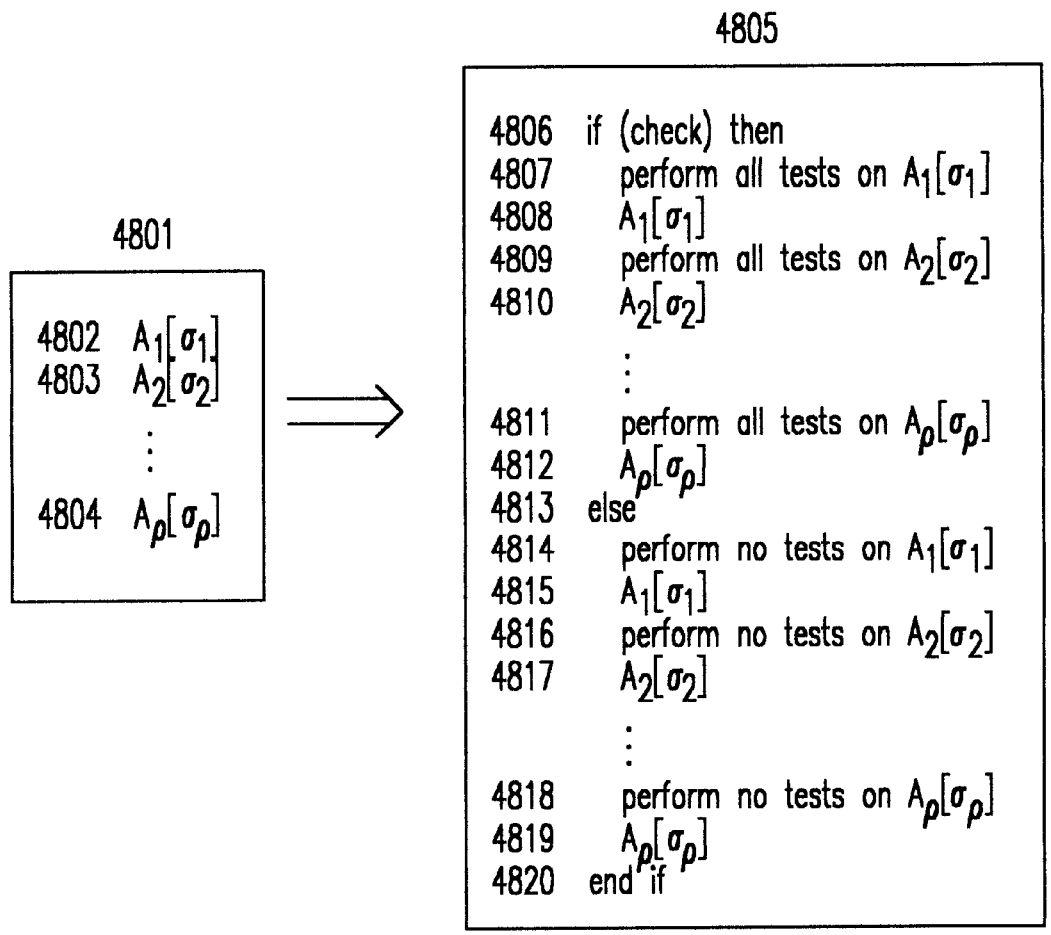
FIG. 48 illustrates the process of generating two versions of code containing a set of array references 4801, the first version (4807–4812) containing tests for all array references and the second version (4814–4819) containing no tests, an if-statement 4806 selecting which version is actually executed.

Consider the sequence of $\rho$ array references $(A_1[\sigma_1], A_2[\sigma_2], \ldots, A_\rho[\sigma_\rho])$ shown in 4801 of FIG. 48. This sequence of references can be replaced by the code in 4805 which dynamically selects from two versions of the references. The version in lines 4807–4812 performs all tests, while the version in lines 4814–4819 does not perform any tests. The selection is based on the value of check, which can be computed as $$\text{check} = \begin{cases} \text{false} & \text{if } lo(A_j) \leq \sigma_j \leq up(A_j) \text{ for all } j = 1, \ldots, p, \\ \text{true} & \text{otherwise.} \end{cases} \quad (65)$$

In general, the evaluation of $lo(A_j) \leq \sigma_j$ and $\sigma_j \leq up(A_j)$ requires symbolic computation and/or run-time evaluation. For loops in particular, it is necessary to represent the range of values that $\sigma_j$ can take. This representation can be in the form of symbolic lower and upper bounds of the range.

This method can be applied to any body of code for which $lo(A_j) \leq \sigma_j$ and $\sigma_j \leq up(A_j)$ can be evaluated. This body of code can be a loop, a section of straight-line code, a whole procedure, or even an entire program or program module. In the worst case, if the value of $lo(A_j) \leq \sigma_j$ or $\sigma_j \leq up(A_j)$ cannot be determined, then a conservative guess has to be made in either comparison, which will cause check to evaluate to true, and the version with all tests to be selected. Note that the selected sequence of references can contain any subset of the actual sequence present in a body of code. Array references left out of the sequence can be treated as a special form of reference that includes tests. These references with tests appear in both versions of code.

Speculative Execution

Quite often, explicit tests for the validity of array references impose an additional performance penalty by constraining some compiler or programmer optimizations. On some systems, the cost associated with these optimization constraints is actually higher than the cost of performing the tests themselves. The cost of these constraints can be minimized by speculatively executing the loop. In speculative execution, two versions of the code are formed. The first contains tests to determine if an invalid array reference occurs, but does not insist that the violations be detected precisely. This allows many optimizations that depend on code motion to occur in this first version. (See S. Muchnick, *Advanced Compiler Design and Implementation*, Morgan Kaufmann Publishers, 1997.) The results of the speculative execution are saved in temporary storage until it is determined that the speculative execution finished without any invalid references occurring. At that point, the results are saved to permanent storage. If an invalid array reference occurs or any other exception is detected, the results in temporary storage are discarded, and the computation is performed again in precise order.

Figure 49:
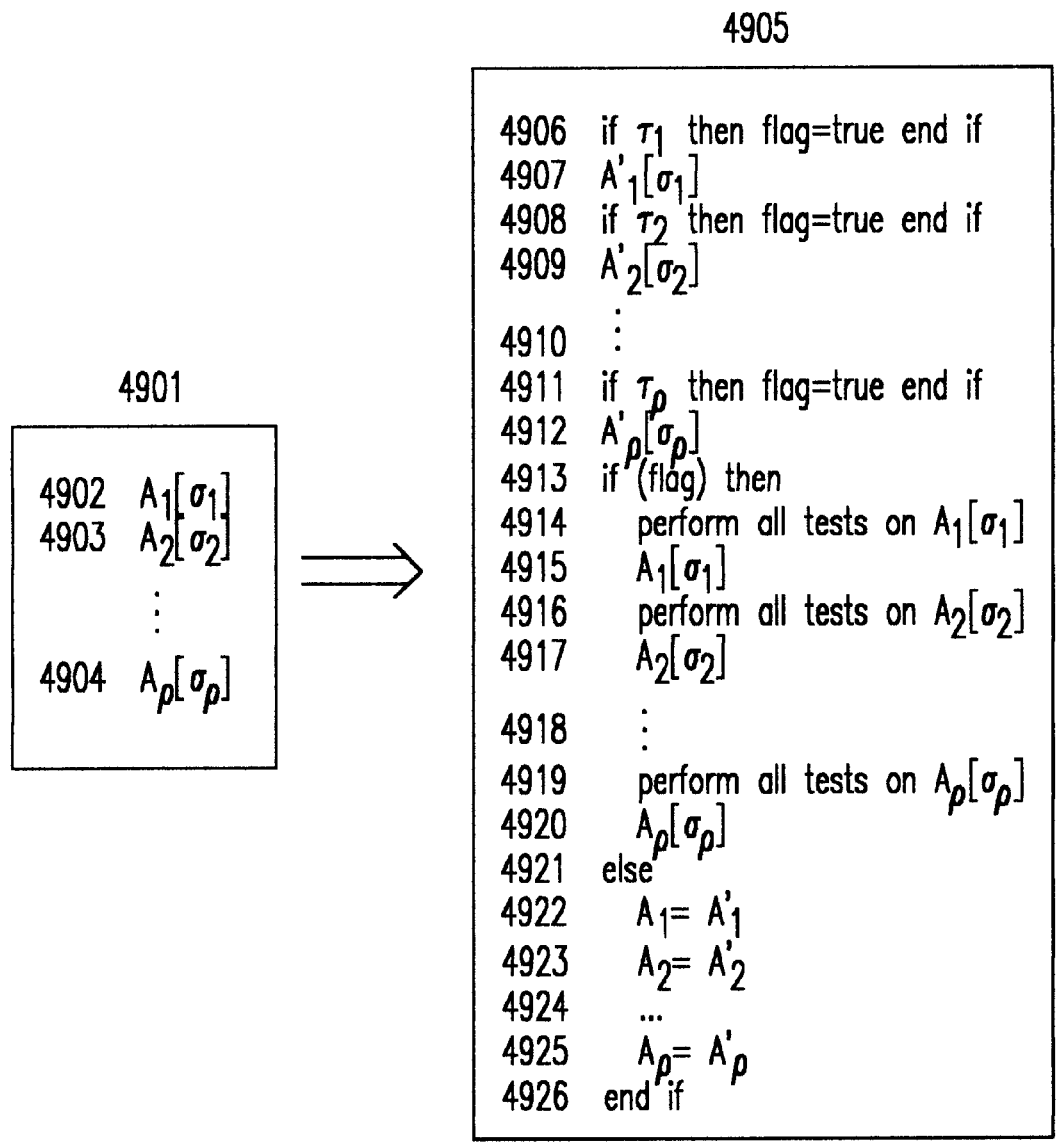
FIG. 49 illustrates the process of generating two versions of code containing a set of array references, the first version (4907–4912) executing the references and computation on those references speculatively, allowing the user or compiler to optimize the code, and if no bounds violations occur, then the code of lines 4922–4925 copies the result of the execution into permanent storage, the second version (4914–4920) executing if an out-of-bounds access occurs during the execution of the first version, optimization and transformations across access checks being disallowed in this version so the access violation is detected precisely, with the state of the program at the time of the violation being preserved.

Let S be a sequence of code containing one or more array references. The transformation of this code to support speculative execution is shown in FIG. 49, where S is represented by 4901. The transformation proceeds as follows. First, two versions of S are generated, with an imprecisely ordered version S' in 4907–4912, and a precisely ordered version $\overline{S}$ in 4914–4920. Tests are placed into the precisely checked version as described in previous methods (4914, 4916, and 4919).

The placement of tests in the imprecisely ordered version is constrained only by the data flow of the program. That is, a the test cannot be done before the array is created or the subscript value can been computed. These tests can be optimized using the methods discussed in the Background of the Invention. When the tests show that an invalid array reference occurs, a flag is set to true. (See, for example, 4906.) This flag indicates that a problem occurred during the execution of the imprecise version and that the precise version should be run. Because array reference violations are not necessarily being detected at the time they occur (either the computation or the tests may have been moved by optimizations), the effect of the computation cannot be allowed to be observed outside of S. Thus, each reference to an array $A_j$ possibly written to in S' is replaced by a reference to a corresponding auxiliary array $A'_j$ (lines 4907, 4909, 4912). An array $A'_j$ is initialized to the value of $A_j$ before execution of S' begins.

If flag is set to true at the end of execution of S', then a violation occurred, and the computation represented by S is rerun with precise ordering in $\overline{S}$ (4914–4920). The $A'_j$ arrays are ignored.

If the flag is set to false, then no array reference violations occurred, and it is necessary to copy the results in the various auxiliary $A_j'$ arrays to their permanent locations. Lines 4922 through Lines 4925 are added to accomplish this. We note that standard techniques can be used to reduce the number of elements that are actually copied between $A_j'$ and $A_j$.

At the end of execution of 4905, independent of the execution path taken, the $A_j'$ auxiliary arrays associated with the $A_j$ arrays can be explicitly freed or garbage collected, depending on the functionality of the underlying run-time system.

While the invention has been described in terms of several preferred embodiments, those skilled in the art will recognize that the invention can be practiced with modification within the spirit and scope of the appended claims.

Having thus described our invention, what we claim as new and desire to secure by Letters Patent is as follows:

1. A method applied to computer programs during execution of the computer programs comprising:
    preventing array references out of the bounds of the array;
    identifying each array reference which refers to an address within the bounds of the array as a valid reference;
    identifying each array reference which refers to an address not within the bounds of the array as an invalid reference;
    executing an inspector program to scan a run-time instruction stream;
    executing the inspector program to determine an estimated outcome for each array reference;
    executing the inspector program to identify which estimated outcomes refer to any invalid address;
    generating test code preceding invalid references only;
    preserving the semantics of the computer program; and
    applying a minimum number of tests for each array reference.

2. The method of claim 1 further comprising:
    semantics of the computer program requiring tests be performed at each and every array reference that may generate an invalid access; and
    semantics of the computer program requiring identifying a precise state of program execution at which any invalid reference is discovered in the computer program.

3. The method of claim 2 further comprising:
    executing a preprocessor which divides a loop body into not more than $5^\rho$ versions of the loop body, where $\rho$ is the number of array references in the loop that are subscripted by a loop control variable controlling the loop.

4. The method of claim 3 further comprising:

using a driver loop to select one of the $5^P$ versions of the loop to use for each iteration.

5. The method of claim 3 further comprising:

using compile-time analysis to recognize those versions of the loop which will never execute and not instantiating those versions of the loop in the program that will never execute.

6. The method of claim 2 further comprising a preprocessor which transforms each loop by the following steps:

dividing the loop into three regions, each region having one of the following properties:
 (i) a region within which all array references using a loop control variable are valid references;
 (ii) a region within which all iterations have only values of the loop control variable less than the least value for the loop control variable in region (i); and
 (iii) a region within which all iterations have only values of the loop control variable greater than the greatest value for the loop control variable in region (i), generating versions of code for each region; and generating tests for array references for regions (ii) and (iii) only.

7. The method of claim 6 further comprising:

transforming loop nests by recursively applying the transformation to each loop in the nest.

8. The method of claim 7 further comprising:

executing the preprocessor to transform the loops in outer- to inner-loop order; and applying recursion only within regions with property (i) of claim 6.

9. The method of claim 2 comprising:

executing a preprocessor to preprocess those loop nests within the program for which each loop nest is comprised of a section of straight-line code composed of zero or more instructions, followed by a loop nest composed of zero or more instructions, followed by a section of straight-line code composed of zero or more instructions; and dividing each loop nest into multiple regions for which regions each region has one condition selected from the following group of conditions:
 (1) no array references are invalid for which the array reference uses a loop control variable; or
 (2) there exists at least one invalid array reference which reference uses a loop control variable.

10. The method of claim 9 comprising:

generating no array reference tests for any region of the loop nest having no invalid array references.

11. The method of claim 9 comprising:

generating all necessary array reference tests for any region of the loop nest having any invalid array references.

12. The method of claim 2 further comprising, for each set of array references:

generating two versions of code according to one condition selected from the following group of conditions:
 a first version for which the execution of each array reference is preceded with code to test for invalid references and a second version generating no tests preceding the execution of each valid array reference; and executing the code with the array reference tests unless there are no invalid references; else executing the code for the second version.

13. The method of claim 2 further comprising the steps of:

generating two versions of code for each set of array references as follows:
 (i) one version which allows optimizations that do not preserve the state of the program when there are any invalid array references, and
 (ii) a second version which does not allow optimizations that do not preserve the state of the program when there are invalid array references;

executing version (i), first;

writing the results of the execution of version (i) to temporary storage;

testing for any invalid array references;

writing the results to permanent storage if there are no invalid array references; and executing version (ii) and writing the results of the execution of version (ii) to permanent storage if there are any invalid array references.

\* \* \* \* \*